(12) United States Patent
Liu

(10) Patent No.: US 11,949,805 B2
(45) Date of Patent: Apr. 2, 2024

(54) CALL METHOD AND APPARATUS

(71) Applicant: HUAWEI TECHNOLOGIES CO., LTD., Guangdong (CN)

(72) Inventor: Xiangning Liu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 133 days.

(21) Appl. No.: 17/826,716

(22) Filed: May 27, 2022

(65) Prior Publication Data
US 2022/0294891 A1 Sep. 15, 2022

Related U.S. Application Data

(63) Continuation of application No. PCT/CN2020/126101, filed on Nov. 3, 2020.

(30) Foreign Application Priority Data

Nov. 30, 2019 (CN) .......................... 201911209344.2

(51) Int. Cl.
*H04M 3/436* (2006.01)
*H04M 1/72412* (2021.01)
*H04W 4/80* (2018.01)

(52) U.S. Cl.
CPC ....... *H04M 1/72412* (2021.01); *H04M 3/436* (2013.01); *H04W 4/80* (2018.02); *H04M 2250/02* (2013.01)

(58) Field of Classification Search
CPC ... H04M 1/72412; H04M 3/436; H04W 4/80; H04W 4/24
See application file for complete search history.

(56) References Cited

U.S. PATENT DOCUMENTS

| | | | |
|---|---|---|---|
| 10,412,206 | B1 | 9/2019 | Liang et al. |
| 2005/0002506 | A1 | 1/2005 | Bender et al. |
| 2015/0156031 | A1 | 6/2015 | Fadell et al. |
| 2018/0260680 | A1 | 9/2018 | Finkelstein et al. |

FOREIGN PATENT DOCUMENTS

| | | |
|---|---|---|
| CN | 104751066 A | 7/2015 |
| CN | 105872434 A | 8/2016 |
| CN | 106416208 A | 2/2017 |
| CN | 106550103 A | 3/2017 |
| CN | 109076188 A | 12/2018 |
| CN | 110138937 A | 8/2019 |
| CN | 110191241 A | 8/2019 |
| CN | 110198362 A | 9/2019 |
| EP | 1806911 A1 | 7/2007 |
| IN | 106470326 A | 3/2017 |

*Primary Examiner* — Tuan H Nguyen
(74) *Attorney, Agent, or Firm* — WOMBLE BOND DICKINSON (US) LLP

(57) ABSTRACT

A call method is provided. In the call method, a first account is associated with a number of called party devices. A calling party device may call the number of called party devices by using the first account. When receiving calling, a called party device that is difficult to carry, such as a smart speaker or a smart television, may detect whether a distance to a smartwatch or a mobile phone having a same account is less than a distance threshold. If the distance is less than the distance threshold, the smart speaker or the smart television may output an incoming call prompt. If the distance is not less than the distance threshold, the smart speaker or the smart television ignores the received calling, and makes no response to the calling.

20 Claims, 28 Drawing Sheets

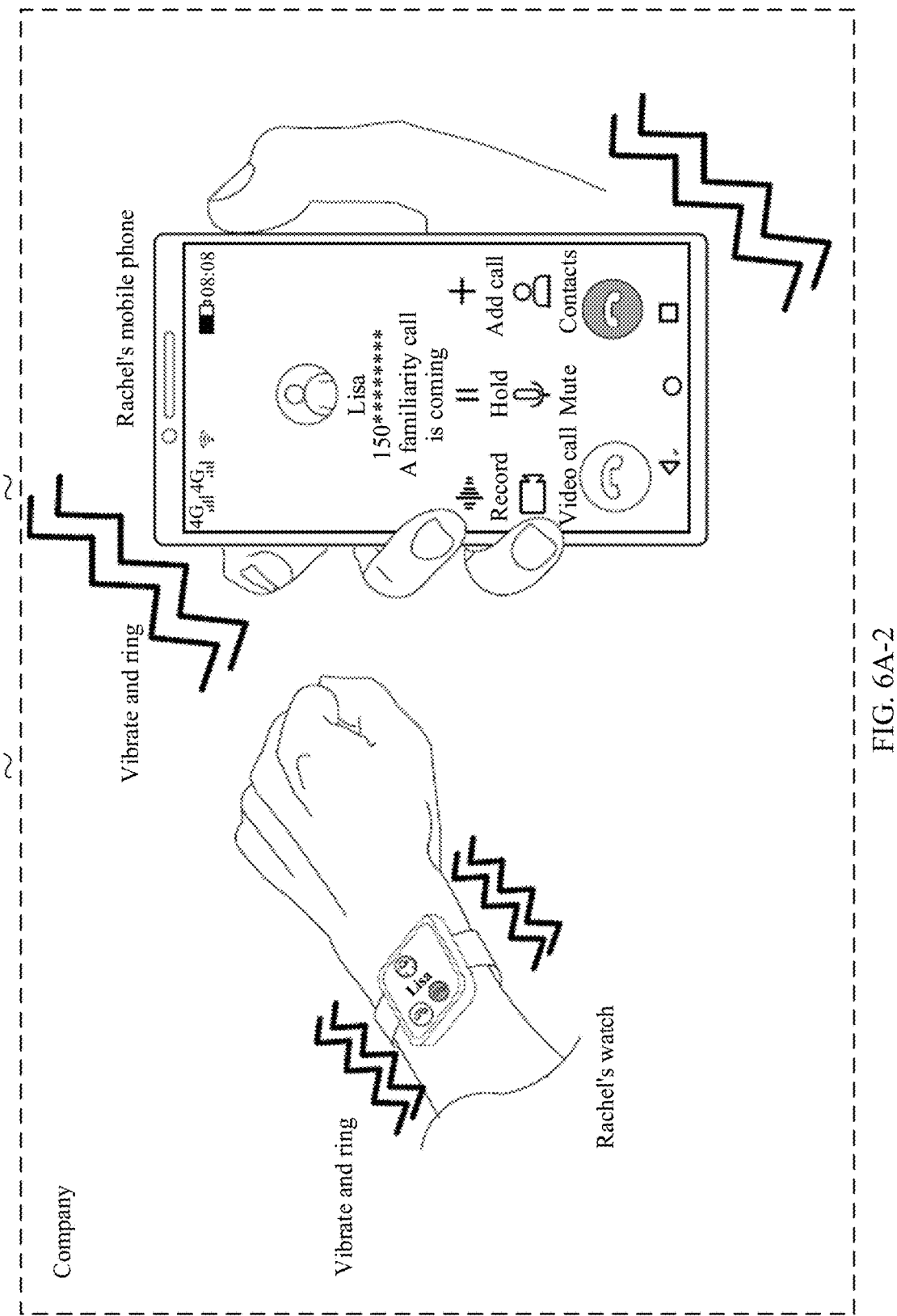

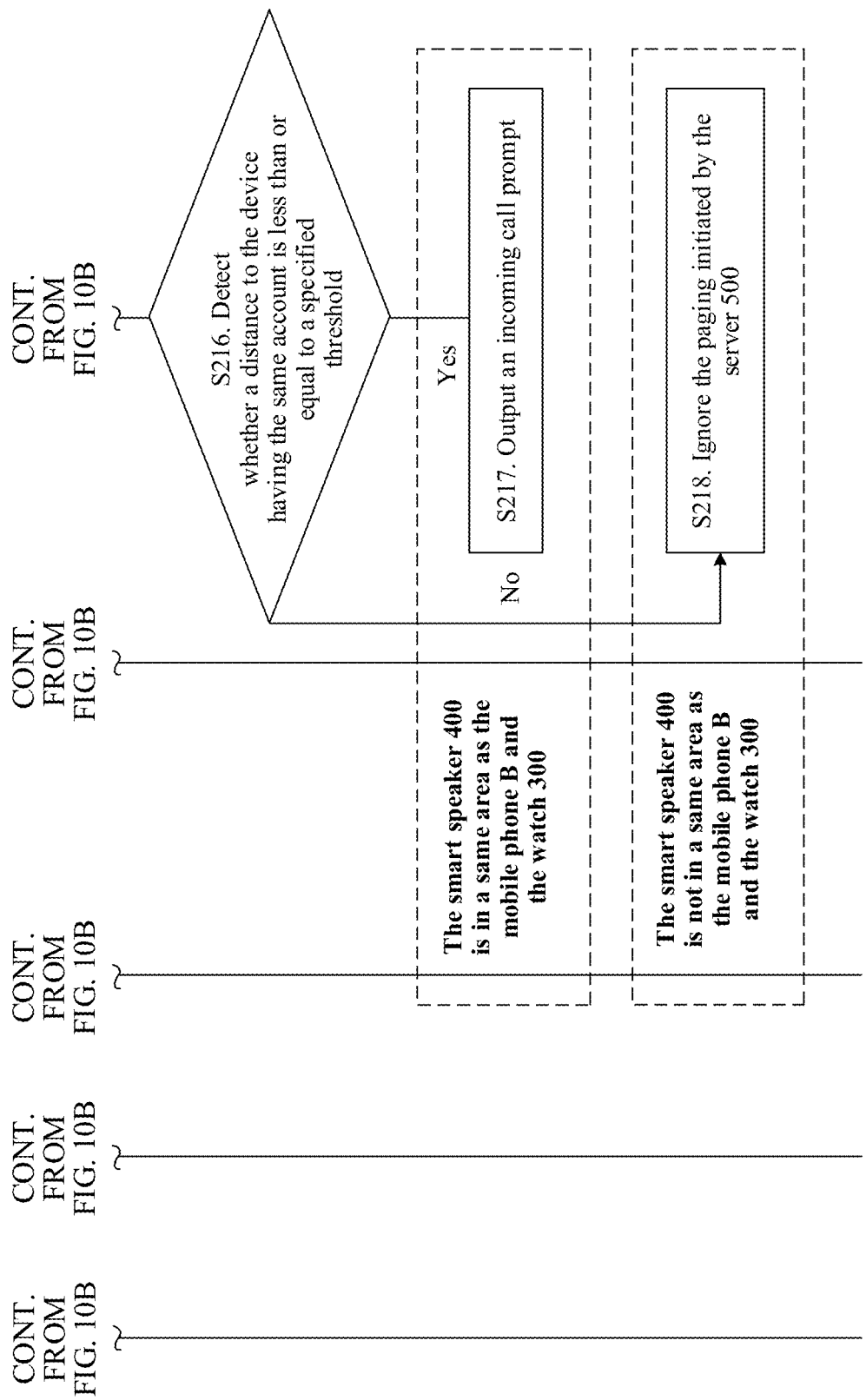

CALL METHOD AND APPARATUS

CROSS-REFERENCE TO RELATED APPLICATIONS

This application is a continuation of International Application No. PCT/CN2020/126101, filed on Nov. 3, 2020, which claims priority to Chinese Patent Application No. 201911209344.2, filed on Nov. 30, 2019. The disclosures of the aforementioned applications are hereby incorporated by reference in their entireties.

TECHNICAL FIELD

This application relates to the field of communications technologies, and in particular, to a call method and a related apparatus.

BACKGROUND

With continuous development of communications technologies, in addition to smartphones, more types of devices such as smart speakers, smart televisions, tablet computers, smartwatches, cameras, and in-vehicle devices may join a communication link.

In a voice and video call scenario, a plurality of devices may be associated with one account. When the account is used as a call account, all the plurality of devices associated with the account receive calling and output incoming call prompts. For example, as an account, a mobile phone number may be associated with a mobile phone, a watch, a smart speaker, and a smart television. When the mobile phone number is used as a call account, each of the mobile phone, the watch, and the smart speaker outputs an incoming call prompt.

However, for a device that is difficult to carry, such as a smart speaker or a smart television, when an incoming call prompt is output, but a user holding a mobile phone associated with an account is not near the device, the incoming call prompt is prone to cause interference to another person, or the current incoming call prompt may be mistakenly answered by another person. This reduces convenience of calling a plurality of devices.

SUMMARY

This application provides a call method and an apparatus. In the call method, a first account is associated with a plurality of called party devices. A calling party device may call the plurality of called party devices by using the first account. A called party device that is difficult to carry, such as a smart speaker or a smart television, may receive calling. The smart speaker outputs an incoming call prompt only when a distance between the smart speaker and a personal device (for example, a smartwatch or a mobile phone) is less than or equal to a specified threshold. This can reduce interference caused by the incoming call prompt to another person when the smart speaker outputs the incoming call prompt but a user is not near the smart speaker, and reduce a case in which the incoming call prompt is mistakenly answered by another person. Therefore, convenience of calling a plurality of devices can be improved.

According to a first aspect, an embodiment of this application provides a call method, and the method is based on a call system. The call system includes a first electronic device, a second electronic device, a server, and a home device. A first application corresponding to the home device is installed on the second electronic device, the first application is logged in to by using a first account, and the first application is for responding to a user operation, so that the second electronic device sends an association relationship between the first account and each of an identifier of the home device and an identifier of the first electronic device to the server. The method includes: The first electronic device obtains the association relationship between the first account and each of the identifier of the home device and the identifier of the first electronic device from the server. The first electronic device displays a call screen based on the association relationship, and receives, on the call screen, a first user operation for calling the first account. In response to the first user operation, the first electronic device sends, to the server, a call request used for calling the second electronic device and a call request used for calling the home device. The server separately initiates calling to the second electronic device and the home device, where the calling carries a simultaneous-ringing identifier. The second electronic device outputs an incoming call prompt. When it is detected that the calling carries the simultaneous-ringing identifier, the home device determines a device whose distance from the home device is less than or equal to a specified threshold. The home device detects whether the device whose distance from the home device is less than or equal to the specified threshold includes a device having a same account, where the same account is the first account, and the device includes the second electronic device. The home device outputs an incoming call prompt if the device whose distance from the home device is less than or equal to the specified threshold includes the device having the same account.

According to the method provided in the first aspect, a called party device that is difficult to carry, such as a smart speaker or a smart television, may receive calling. The home device outputs an incoming call prompt only when a distance between the home device and a personal device (for example, a smartwatch or a mobile phone) is less than or equal to a specified threshold. This can reduce interference caused by the incoming call prompt to another person when the home device outputs the incoming call prompt but a user is not near the home device, and reduce a case in which the incoming call prompt is mistakenly answered by another person. Therefore, convenience of calling a plurality of devices can be improved.

In embodiments of this application, the home device may determine, through short-range wireless search, for example, Wi-Fi search or Bluetooth search, the device whose distance from the home device is less than or equal to the specified threshold. A implementation is as follows:

1. Determine a found device based on an RSSI broadcast by a surrounding device.

The home device learns of, through short-range wireless search, a device whose distance from the home device is within a specified threshold. Then, the home device may obtain, from the server, a device identifier of a device having a same account, and detect whether a device identifier of the device within the specified threshold includes the device identifier of the device.

2. Determine a found device based on an SSID of a Wi-Fi network connected to a surrounding device.

The home device learns of a device connected to a same Wi-Fi network as the home device. The device in the same Wi-Fi network is a device whose distance from the home device is less than or equal to a specified threshold. The device in the same Wi-Fi network is a device connected to a Wi-Fi network having a same SSID.

In embodiments of this application, in addition to the foregoing manner in which the home device performs short-range wireless search, short-range wireless search may alternatively be performed by a personal device. For example, a mobile phone (namely, the second electronic device) or a smartwatch searches for a device. Specifically, in an example in which a mobile phone searches for a device, calling initiated by the server to the mobile phone may also carry a simultaneous-ringing identifier. When receiving the calling initiated by the server, the mobile phone may perform short-range wireless search, for example, search for a near-field device through Wi-Fi. The mobile phone may perform trust authentication on a found near-field device, and detect whether there is a smart speaker having a same account in a device on which authentication succeeds. If there is the smart speaker having the same account, the mobile phone may notify the smart speaker, and the smart speaker may output an incoming call prompt based on the notification.

In some embodiments of this application, the second electronic device may alternatively report positioning information to the server when receiving the calling. The home device receives the calling initiated by the server, and when detecting that the calling carries the simultaneous-ringing identifier, the home device obtains, from the server, positioning information of the device having the same account as the home device, where the same account is the first account, and the device includes the second electronic device. The home device determines, based on the positioning information of the device, whether a distance between the home device and the device is within a specified threshold. The home device outputs an incoming call prompt if the distance between the home device and the device is within the specified threshold.

Optionally, the second electronic device reports the positioning information to the server when receiving the calling, and the home device may also report positioning information to the server when receiving the calling. The server may determine, based on the positioning information of the home device and the positioning information of the second electronic device, whether a distance between the home device and the second electronic device is within a specified threshold. The server may notify the home device whether the distance between the home device and the device (for example, the second electronic device) is within the specified threshold. If the distance is within the specified threshold, the home device outputs the incoming call prompt.

According to a second aspect, an embodiment of this application provides a call method. The method includes: A home device receives calling initiated by a server, where the calling carries a simultaneous-ringing identifier. When it is detected that the calling carries the simultaneous-ringing identifier, the home device detects whether a device whose distance from the home device is within a specified threshold includes a device having a same account. The home device outputs an incoming call prompt when the device within the specified threshold includes the device having the same account.

According to the method provided in the second aspect, a home device that is difficult to carry, such as a smart speaker or a smart television, may receive calling. The home device outputs the incoming call prompt only when the distance between the home device and the device having the same account (for example, a second electronic device) is less than or equal to the specified threshold. This can reduce a case in which the incoming call prompt interferes with another person or the incoming call prompt is mistakenly answered by another person when the home device outputs the incoming call prompt but a user is not near the home device. Therefore, convenience of calling a plurality of devices can be improved.

An identifier of a device may be a MAC address of the device, or may be an identifier generated based on the MAC address, or may be another identifier that uniquely identifies a called party device. A type of the device identifier is not limited in embodiments of this application. The server may address the called party device based on the device identifier, and initiates calling.

In an embodiment, a first account may be a Huawei account, and the Huawei account is registered by using a mobile phone number.

With reference to the second aspect, in some embodiments, before the home device detects whether the device whose distance from the home device is within the specified threshold includes the device having the same account, the method further includes: The home device performs trust authentication on the device within the specified threshold to learn of a device on which the authentication succeeds. That the home device detects whether the device within the specified threshold includes the device having the same account includes: The home device detects whether the device on which the authentication succeeds includes the device having the same account. When the device on which the authentication succeeds includes the device having the same account, the device within the specified threshold includes the device having the same account.

The home device may perform trust authentication by using an asymmetric encryption technology. The home device detects only the device on which the authentication succeeds to determine whether the device having the same account is included. Therefore, security of calling a plurality of devices is improved.

With reference to the second aspect, in some embodiments, that the home device detects whether the device whose distance from the home device is within the specified threshold includes the device having the same account includes: The home device obtains, through short-range wireless search, information about the device whose distance from the home device is within the specified threshold.

In a short-range wireless search manner, the home device searches, through Wi-Fi, for a broadcast sent by a surrounding device, and detects an RSSI in the broadcast sent by the surrounding device and a MAC address carried in the broadcast. Specifically, the home device may determine, based on the MAC address and the RSSI of the surrounding device, a device within a distance range, that is, a device found by the home device. The distance range is, for example, a range of 10 meters from the home device.

In some other embodiments, in a short-range wireless search manner, the home device searches, through Wi-Fi, for a broadcast sent by a surrounding device, and detects a device that has a same SSID as the Wi-Fi connected to the home device. To be, that the home device obtains, through short-range wireless search, the information about the device whose distance from the home device is within the specified threshold includes: The home device obtains information about a device that is located in a same Wi-Fi network as the home device, and determines the device that is located in the same Wi-Fi network as the home device as the device whose distance from the home device is within the specified threshold.

With reference to the second aspect, in some embodiments, that the home device detects whether the device whose distance from the home device is within the specified threshold includes the device having the same account includes: The home device obtains, from the server, a device identifier of the device having the same account. The home device detects whether a device identifier of the device within the specified threshold includes the device identifier of the device. When the identifier of the device within the specified threshold includes the device identifier of the device, the device within the specified threshold includes the device having the same account.

With reference to the second aspect, in some embodiments, that the home device detects whether the device whose distance from the home device is within the specified threshold includes the device having the same account includes: The home device obtains, from the server, positioning information of the device having the same account as the home device, where the positioning information of the device is sent by the device to the server when the device receives calling. The home device determines, based on the positioning information of the device, whether a distance between the home device and the device is within the specified threshold.

With reference to the second aspect, in some embodiments, the same account is a first account, and the device includes the second electronic device. An association relationship between the first account and each of an identifier of the home device and an identifier of the second electronic device is stored on the server, and calling is initiated to the home device and the second electronic device based on the association relationship. With reference to the second aspect, in some embodiments, the device includes a smartwatch, and the server further stores an association relationship between the first account and an identifier of the smartwatch. The smartwatch receives calling initiated by the server.

With reference to the second aspect, in some embodiments, a first application corresponding to the home device is installed on the second electronic device, and the first application is logged in to by using the first account. A second application corresponding to the smartwatch is further installed on the second electronic device, and the second application is logged in to by using the first account.

The association relationship between the second electronic device and the first account may be sent to the server together with the association relationship between the home device and the first account. In other words, the first account is associated with the second electronic device and the home device, and the second electronic device sends the association relationships to the server. The association relationship between the first account and the home device may be generated by the home device on a corresponding application (for example, Huawei Wear) on the second electronic device in response to a user operation, and then sent to the server.

Alternatively, in some embodiments of this application, the server may store a communication ID of the called party device, where the communication ID may be used by the server to establish a call channel to the called party device. The called party device may include a device associated with the first account. Specifically, the server may address the called party device based on the communication ID of the called party device, and initiate calling.

With reference to the second aspect, in some embodiments, the home device is connected to a data network, so that the home device establishes a communication connection to the server. For example, the home device enables an operator data switch.

In some other embodiments, the home device is connected to the data network through a local area network. For example, the home device enables a Wi-Fi switch, connects to Wi-Fi, and connects to a data network through the Wi-Fi.

The home device may distinguish, based on device identifiers, a device (for example, a personal device carried by a user) from a device that is difficult to carry.

In embodiments of this application, the home device may output an incoming call prompt provided that the home device detects that a distance or distances between the home device and one or more devices (including the smartwatch and the second electronic device) is/are within the specified threshold. For example, the home device may output an incoming call prompt when the home device detects that a distance between the home device and the smartwatch in the device is within the specified threshold. For another example, the home device may output an incoming call prompt when the home device detects that a distance between the home device and the second electronic device in the device is within the specified threshold. For still another example, the home device may output an incoming call prompt when the home device detects that a distance between the home device and the second electronic device in the device is within the specified threshold, and a distance between the home device and the smartwatch in the device is within the specified threshold.

In some other embodiments, a time point at which the server initiates calling to the home device may be later than a time point at which the server initiates calling to the second electronic device. In this way, a time point at which the server obtains positioning information of the second electronic device may be earlier than a time point at which the home device obtains the positioning information of the second electronic device from the server.

According to a third aspect, an embodiment of this application provides a call method. The method includes: A second electronic device receives calling initiated by a server, where the calling carries a simultaneous-ringing identifier. A first application corresponding to a home device is installed on the second electronic device, the first application is logged in to by using a first account, and the first application is for responding to a user operation, so that the second electronic device or the home device sends an association relationship between the first account and each of an identifier of the home device and an identifier of a first electronic device to the server. The second electronic device sends positioning information of the second electronic device to the server when it is detected that the calling carries the simultaneous-ringing identifier. The positioning information of the second electronic device is used by the home device to: when the home device receives calling, detect a distance between the home device and a device having a same account, and determine, based on the distance between the home device and the device having the same account, whether to output an incoming call prompt. The same account is the first account, and the device includes the second electronic device. The second electronic device outputs an incoming call prompt.

According to the method provided in the third aspect, the second electronic device may send the positioning information of the second electronic device to the server when receiving the calling. A home device that is difficult to carry, such as a smart speaker or a smart television, may receive calling. The home device outputs an incoming call prompt only when the home device detects, based on positioning information of the device, that a distance between the home device and the device having the same account (for example, a smartwatch or the second electronic device) is less than or equal to a specified threshold. This can reduce a case in which the incoming call prompt interferes with another person or the incoming call prompt is mistakenly answered by another person when the home device outputs the incoming call prompt but a user is not near the home device. Therefore, convenience of calling a plurality of devices can be improved.

With reference to the third aspect, in some embodiments, before the second electronic device sends the positioning information of the second electronic device to the server when it is detected that the calling carries the simultaneous-ringing identifier, the method further includes: The second electronic device displays a first user interface of the first application, where the first user interface includes second prompt information and an "allow" control, and the second prompt information indicates whether to allow the second electronic device to report the positioning information. In response to a user operation performed on the "allow" control, the second electronic device is allowed to send the positioning information of the second electronic device to the server. The second electronic device can send the positioning information of the second electronic device to the server only after the second electronic device is allowed to send the positioning information of the second electronic device to the server.

In embodiments of this application, before the second electronic device sends the positioning information of the second electronic device to the server, the second electronic device notifies, by using the first user interface, a user that sensitive information such as location information is to be reported, and reports the positioning information to the server only after being authorized by the user. This improves security of personal location information of the user.

The first user interface may be a prompt box, and the second prompt information may provide a prompt "the incoming call synchronization service will obtain your location information". The incoming call synchronization service means that a plurality of devices associated with a same account may be called by using the first account.

With reference to the third aspect, in some embodiments, the second electronic device is connected to a data network or is connected to the data network through a local area network, so that the second electronic device establishes a communication connection to the server.

The second electronic device is connected to the data network, so that the second electronic device establishes the communication connection to the server. For example, the second electronic device enables an operator data switch.

In some other embodiments, the second electronic device is connected to the data network through the local area network. For example, the second electronic device enables a Wi-Fi switch, connects to Wi-Fi, and connects to a data network through the Wi-Fi.

According to a fourth aspect, an embodiment of this application provides a home device. The home device includes one or more processors, a memory, and one or more computer programs, where the one or more computer programs are stored in the memory, the one or more computer programs include instructions, and when the instructions are executed by the home device, the home device is enabled to perform the following operations: receiving calling initiated by a server, where the calling carries a simultaneous-ringing identifier; when it is detected that the calling carries the simultaneous-ringing identifier, detecting whether a device whose distance from the home device is within a specified threshold includes a device having a same account; and outputting an incoming call prompt when the device within the specified threshold includes the device having the same account.

According to the home device provided in the fourth aspect, a home device that is difficult to carry, such as a smart speaker or a smart television, may receive calling. The home device outputs the incoming call prompt only when the distance between the home device and the device having the same account (for example, a second electronic device) is less than or equal to the specified threshold. This can reduce a case in which the incoming call prompt interferes with another person or the incoming call prompt is mistakenly answered by another person when the home device outputs the incoming call prompt but a user is not near the home device. Therefore, convenience of calling a plurality of devices can be improved.

With reference to the fourth aspect, in some embodiments, when the instructions are executed by the home device, the home device further performs the following operation: performing trust authentication on the device within the specified threshold to learn of a device on which the authentication succeeds. When the instructions are executed by the home device, the home device is enabled to perform the following operation: detecting whether the device on which the authentication succeeds includes the device having the same account. The device within the specified threshold includes the device having the same account when the device on which the authentication succeeds includes the device having the same account.

With reference to the fourth aspect, in some embodiments, when the instructions are executed by the home device, the home device is enabled to perform the following operations: The home device obtains, through short-range wireless search, information about the device whose distance from the home device is within the specified threshold; and the home device detects whether the information about the device within the specified threshold includes information about the device having the same account.

With reference to the fourth aspect, in some embodiments, when the instructions are executed by the home device, the home device is enabled to perform the following operations: obtaining information about a device that is located in a same Wi-Fi network as the home device, and determining the device that is located in the same Wi-Fi network as the home device as the device whose distance from the home device is within the specified threshold.

With reference to the fourth aspect, in some embodiments, when the instructions are executed by the home device, the home device is enabled to perform the following operations: obtaining, from the server, a device identifier of the device having the same account; and detecting whether a device identifier of the device within the specified threshold includes the device identifier of the device. When the identifier of the device within the specified threshold includes the device identifier of the device, the device within the specified threshold includes the device having the same account.

With reference to the fourth aspect, in some embodiments, when the instructions are executed by the home device, the home device is enabled to perform the following operations: The home device obtains, from the server, positioning information of the device having the same account as the home device, where the positioning information of the device is sent by the device to the server when the device receives calling. The home device determines, based on the positioning information of the device, whether a distance between the home device and the device is within the specified threshold.

With reference to the fourth aspect, in some embodiments, the same account is a first account, and the device includes the second electronic device. An association relationship between the first account and each of an identifier of the home device and an identifier of the second electronic device is stored on the server, and calling is initiated to the home device and the second electronic device based on the association relationship.

With reference to the fourth aspect, in some embodiments, the device further includes a smartwatch, and the server further stores an association relationship between the first account and an identifier of the smartwatch. The smartwatch receives calling initiated by the server.

With reference to the fourth aspect, in some embodiments, a first application corresponding to the home device is installed on the second electronic device, and the first application is logged in to by using the first account. A second application corresponding to the smartwatch is further installed on the second electronic device, and the second application is logged in to by using the first account.

With reference to the fourth aspect, in some embodiments, the home device is connected to a data network or is connected to the data network through a local area network, so that the home device establishes a communication connection to the server.

According to a fifth aspect, an embodiment of this application provides an electronic device, and the electronic device is a second electronic device. The second electronic device includes one or more processors, a memory, and a plurality of applications, where the plurality of applications include a first application. The second electronic device further includes one or more computer programs, where the one or more computer programs are stored in the memory, the one or more computer programs include instructions, and when the instructions are executed by the electronic device, the electronic device is enabled to perform the method according to any one of the third aspect or the embodiments of the third aspect.

According to a sixth aspect, an embodiment of this application provides a call system. The call system includes a first electronic device, a second electronic device, a server, and a home device, and the call system is configured to perform the method according to any one of the first aspect or the embodiments of the first aspect.

According to a seventh aspect, an embodiment of this application provides a chip, and the chip is used in a home device. The chip includes one or more processors, and the processor is configured to invoke computer instructions, so that the home device performs the method according to any one of the second aspect or the embodiments of the second aspect.

According to an eighth aspect, an embodiment of this application provides a chip, and the chip is used in an electronic device. The chip includes one or more processors, and the processor is configured to invoke computer instructions, so that the home device performs the method according to any one of the third aspect or the embodiments of the third aspect.

According to a ninth aspect, an embodiment of this application provides a computer program product including instructions. When the computer program product runs on a home device, the home device is enabled to perform the method according to any one of the second aspect or the embodiments of the second aspect.

According to a tenth aspect, an embodiment of this application provides a computer program product including instructions. When the computer program product runs on an electronic device, the electronic device is enabled to perform the method according to any one of the third aspect or the embodiments of the third aspect.

According to an eleventh aspect, an embodiment of this application provides a computer-readable storage medium, including instructions. When the instructions are run on a home device, the home device is enabled to perform the method according to any one of the second aspect or the embodiments of the second aspect.

According to a twelfth aspect, an embodiment of this application provides a computer-readable storage medium, including instructions. When the instructions are run on an electronic device, the electronic device is enabled to perform the method according to any one of the third aspect or the embodiments of the third aspect.

It may be understood that, the electronic device provided in the fifth aspect, the call system provided in the sixth aspect, the chip provided in the seventh aspect, the chip provided in the eighth aspect, the computer program product provided in the ninth aspect, the computer program product provided in the tenth aspect, the computer storage medium provided in the eleventh aspect, and the computer storage medium provided in the twelfth aspect are all configured to perform the method provided in embodiments of this application. Therefore, for beneficial effects that can be achieved, refer to beneficial effects in the corresponding method. Details are not described herein again.

BRIEF DESCRIPTION OF DRAWINGS

FIG. 6A-1 and FIG. 6A-2 and FIG. 6B-1 and FIG. 6B-2 each are a schematic diagram of a call scenario according to an embodiment of this application;

FIG. 10A to FIG. 10C are a schematic flowchart of another call method according to an embodiment of this application.

DESCRIPTION OF EMBODIMENTS

The following clearly describes technical solutions in embodiments of this application in detail with reference to the accompanying drawings. In descriptions of embodiments of this application, "I" indicates "or" unless otherwise stated. For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

The following describes a system architecture provided in an embodiment of this application.

Figure 1:
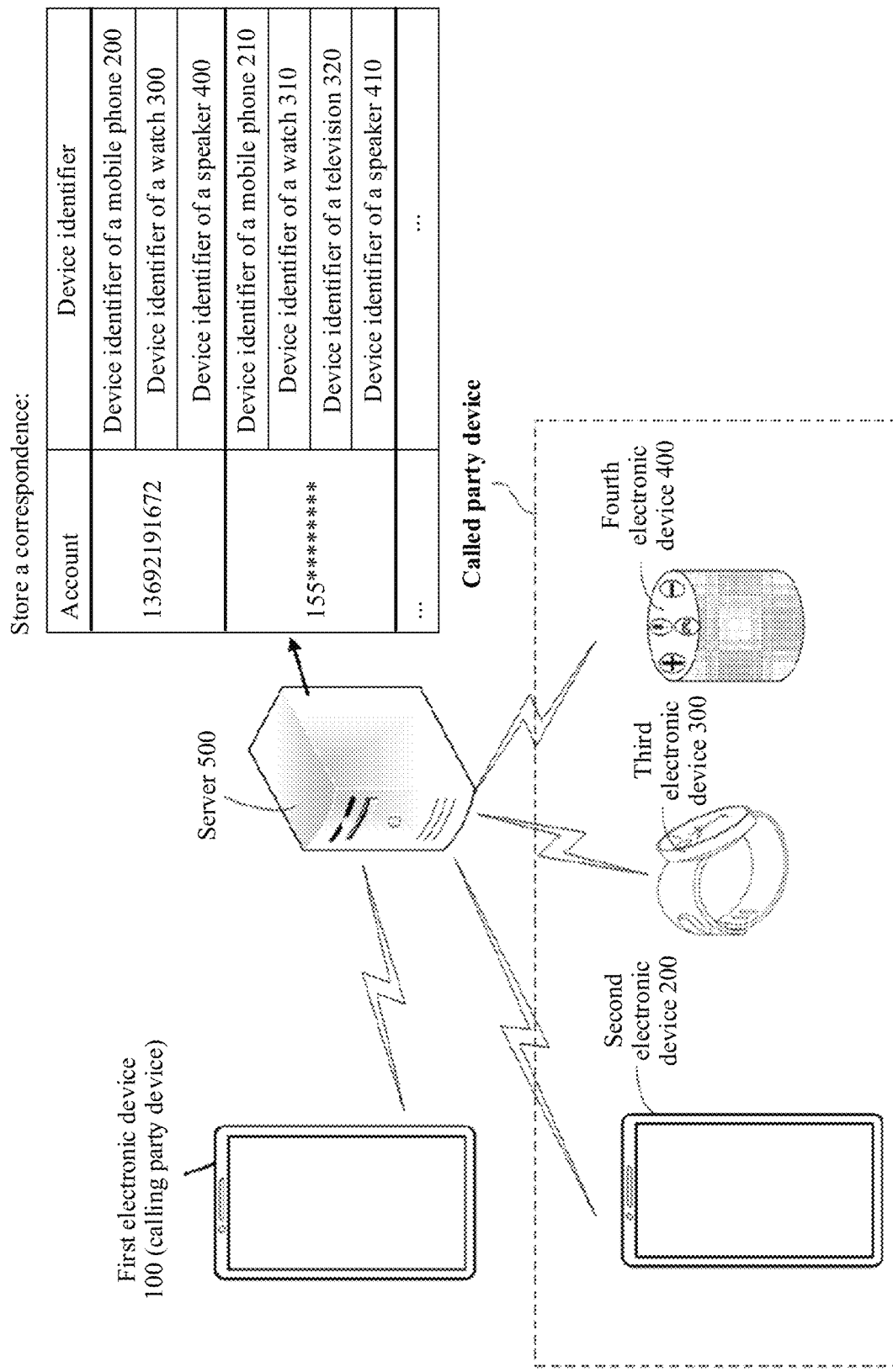
FIG. 1 is a schematic diagram of an architecture of a call system according to an embodiment of this application.

FIG. 1 is a schematic diagram of an architecture of a call system according to an embodiment of this application. As shown in FIG. 1, the call system may include: a calling party device, namely, a first electronic device 100; called party devices, including a second electronic device 200, a third electronic device 300, and a fourth electronic device 400; and a server 500.

The first electronic device 100 may be configured to call the called party devices by using a first account. The first account may be associated with the called party devices. In other words, devices associated with the first account include the second electronic device 200, the third electronic device 300, and the fourth electronic device 400. The association relationships may be stored on the server 500.

The first electronic device 100 may query, on the server 500, the devices associated with the first account. The devices include, for example, the second electronic device 200, the third electronic device 300, and the fourth electronic device 400. When the first electronic device 100 makes a call by using the first account, the first electronic device 100 may separately initiate calling to the second electronic device 200, the third electronic device 300, and the fourth electronic device 400.

The called party devices may include the second electronic device 200, the third electronic device 300, and the fourth electronic device 400. The called party device may make a response when receiving calling initiated by the server 500. For example, the second electronic device 200 may be a mobile phone. When receiving the calling initiated by the server 500, the mobile phone may vibrate or ring according to a current profile of the mobile phone, and display an incoming call screen on the mobile phone. The third electronic device 300 may be a smartwatch. When receiving the calling initiated by the server 500, the smartwatch may vibrate or ring according to a current profile of the smartwatch, and display an incoming call screen on the smartwatch. The fourth electronic device 400 may be a smart speaker. When receiving the calling initiated by the server 500, the smart speaker may output a voice prompt based on the calling initiated by the server 500, for example, output a voice "A family member is calling. Please choose to answer or hang up . . . ".

The server 500 may be configured to store a correspondence between an account and an associated device. For example, the server 500 stores the first account and the devices associated with the first account, including the second electronic device 200, the third electronic device 300, and the fourth electronic device 400. Specifically, the server 500 may store the first account and device identifiers corresponding to the first account, including a device identifier of the second electronic device 200, a device identifier of the third electronic device 300, and a device identifier of the fourth electronic device 400. Alternatively, the server 500 may store a communication ID of the called party device, where the communication ID may be used by the server 500 to establish a call channel to the called party device.

In embodiments of this application, the communication ID is, for example, a product serial number (serial number, SN) or a universally unique identifier (universally unique identifier, UUID). In embodiments of this application, the communication ID is not limited to the foregoing example, and may alternatively be another identifier number or a sequence generated based on an identifier number.

For example, as shown in FIG. 1, the server 500 may store a first account "136******" and another account, for example, an account "155****". The service may further store a device identifier corresponding to each account. For example, the first account "136****" corresponds to a device identifier of a mobile phone 200, a device identifier of a watch 300, and a device identifier of a speaker 400. The account "155******" corresponds to a device identifier of a mobile phone 210, a device identifier of a watch 310, a device identifier of a television 320, and a device identifier of a speaker 410. None of the mobile phone 210, the watch 310, the television 320, and the speaker 410 is shown in FIG. 1.

The following describes communication connections among the calling party device, the called party device, and the server 500. The first electronic device 100 may establish a communication connection to the server 500. The communication connection between the first electronic device 100 and the server 500 may be used by the first electronic device 100 to learn, from the server 500, of a device associated with an account, and may further be used to send a call request to the server 500.

The server 500 may establish a communication connection to the called party device, and the communication connection may be used to address the called party device.

The following describes a process in which the calling party device calls the called party devices. The first electronic device 100 may separately call the called party devices by using the server 500. As shown in FIG. 1, the first electronic device 100 may separately send, to the server 500, call requests used for calling the second electronic device 200, the third electronic device 300, and the fourth electronic device 400. In an example of calling the second electronic device 200, the call request may carry the device identifier of the second electronic device 200. The server 500 may obtain a communication ID of the second electronic device 200 based on the carried device identifier of the second electronic device 200, address the second electronic device 200 based on the communication ID, and initiate calling to the second electronic device 200. Processes of calling the third electronic device 300 and calling the fourth electronic device 400 may be similar to a process of calling the second electronic device 200 by the first electronic device 100.

In embodiments of this application, the calling party device may be connected to a data network (for example, an operator data network) or connected to a data network through a local area network, so that the calling party device establishes a communication connection to the server 500. The called party device may also be connected to a data network or connected to a data network through a local area network, so that the server 500 may establish a communication connection to the called party device, and the communication connection is used to address the called party device. When the called party device is not connected to a data network and is not connected to a local area network, the server 500 fails to address the called party device. In this case, the server 500 cannot initiate calling to the called party device. As a result, the calling party device fails to call the called party device. When the calling party device is not connected to a data network and is not connected to a local area network, the calling party device fails to send a call request to the server 500. As a result, the calling party device fails to call the called party device.

In embodiments of this application, the second electronic device 200 may report positioning information through a communication connection between the second electronic device 200 and the server 500. The fourth electronic device 400 may query the positioning information of the second electronic device 200 through a communication connection between the fourth electronic device 400 and the server 500, and determine, based on the positioning information, whether the second electronic device 200 and the fourth electronic device 400 are in a same area, that is, whether a distance between the second electronic device 200 and the fourth electronic device 400 is within a specified range (for example, a range of 20 meters).

In embodiments of this application, the third electronic device 300 is not limited to the smartwatch, and may alternatively be a wearable device such as a band. The fourth electronic device 400 is not limited to the smart speaker, and may alternatively be a terminal device such as a notebook computer, a palmtop computer, a tablet computer, a smart television, a portable media playing device, or an in-vehicle media playing device.

Figure 2A:
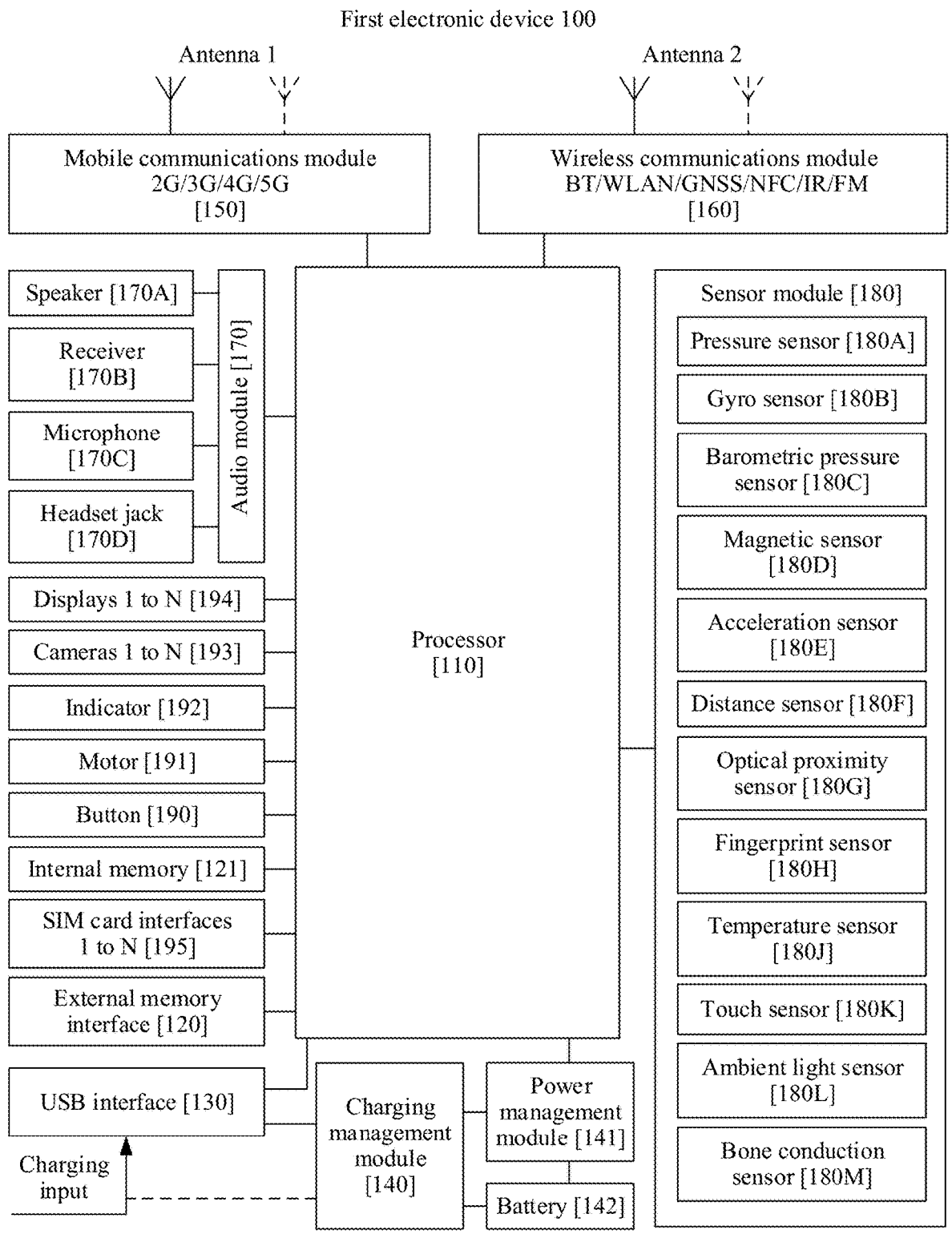
FIG. 2A is a schematic diagram of a structure of a second electronic device 200 according to an embodiment of this application.

FIG. 2A is a schematic diagram of a structure of a second electronic device 200 according to an embodiment of this application.

The following uses the second electronic device 200 for description. It should be understood that the second electronic device 200 shown in FIG. 2A is merely an example, and the second electronic device 200 may include more or fewer components than those shown in FIG. 2A, may combine two or more components, or may have different component configurations. The components shown in the figure may be implemented in hardware including one or more signal processing and/or application-integrated circuits, software, or a combination of hardware and software.

The second electronic device 200 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent devices, or may be integrated into one or more processors.

The controller may be a nerve center and a command center of the second electronic device 200. The controller may generate an operation control signal based on instruction operation code and a time sequence signal, to complete control of instruction fetching and instruction execution.

A memory may further be disposed in the processor 110, and is configured to store instructions and data.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronous serial bus, and includes a serial data line (SDA) and a serial clock line (SCL).

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170.

The PCM interface may also be used for audio communication, to sample, quantize, and encode an analog signal. In some embodiments, the audio module 170 may be coupled to the wireless communications module 160 through a PCM bus interface.

The UART interface is a universal serial data bus, and is used for asynchronous communication. The bus may be a two-way communications bus. The bus converts to-be-transmitted data between serial communication and parallel communication. In some embodiments, the UART interface is usually configured to connect the processor 110 to the wireless communications module 160.

The MIPI interface may be configured to connect the processor 110 to a peripheral device such as the display 194 or the camera 193. The MIPI interface includes a camera serial interface (CSI), a display serial interface (DSI), and the like.

The GPIO interface may be configured by using software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, and the like. The GPIO interface may alternatively be configured as an I2C interface, an I2S interface, a UART interface, an MIPI interface, or the like.

The USB interface 130 is an interface that conforms to a USB standard specification, and may be a mini USB interface, a micro USB interface, a USB Type-C interface, or the like.

It may be understood that an interface connection relationship between the modules shown in embodiments of the present disclosure is merely an example for description, and does not constitute a limitation on the structure of the second electronic device 200. In some other embodiments of this application, the second electronic device 200 may alternatively use an interface connection manner different from that in the foregoing embodiment, or a combination of a plurality of interface connection manners.

The charging management module 140 is configured to receive charging input from a charger. The charger may be a wireless charger, or may be a wired charger. In some embodiments of wired charging, the charging management module 140 may receive charging input of the wired charger through the USB interface 130.

The power management module 141 is configured to connect the battery 142, the charging management module 140, and the processor 110. The power management module 141 receives input from the battery 142 and/or the charging management module 140, and supplies power to the processor 110, the internal memory 121, an external memory, the display 194, the camera 193, the wireless communications module 160, and the like.

A wireless communication function of the second electronic device 200 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna of the second electronic device 200 may be configured to cover one or more communication frequency bands. Different antennas may further be multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a solution applied to the second electronic device 200 for wireless communication including 2G/3G/4G/5G and the like. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert an amplified signal into an electromagnetic wave for radiation through the antenna 1. In some embodiments, at least some function modules of the mobile communications module 150 may be disposed in the processor 110.

The modem processor may include a modulator and a demodulator. The modulator is configured to modulate a to-be-sent low-frequency baseband signal into a medium- or high-frequency signal. The demodulator is configured to demodulate a received electromagnetic wave signal into a low-frequency baseband signal. Then the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (which is not limited to the speaker 170A, the receiver 170B, or the like), or displays an image or a video on the display 194. In some embodiments, the modem processor may be an independent device. In some other embodiments, the modem processor may be independent of the processor 110, and is disposed in a same device as the mobile communications module 150 or another function module.

The wireless communications module 160 may provide a wireless communication solution that includes a wireless local area network (WLAN) (for example, a wireless fidelity (Wi-Fi) network), a BR/EDR, BLE, a global navigation satellite system (GNSS), frequency modulation (FM), a near field communication (NFC) technology, an infrared (IR) technology, or the like and that is applied to the second electronic device 200. The wireless communications module 160 may be one or more devices integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, the antenna 1 and the mobile communications module 150 of the second electronic device 200 are coupled, and the antenna 2 and the wireless communications module 160 of the second electronic device 200 are coupled, so that the second electronic device 200 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), a basic rate/enhanced data rate (BR/EDR), a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The second electronic device 200 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs, and execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini LED, a micro LED, a micro OLED, a quantum dot light emitting diode (QLED), or the like.

The second electronic device 200 may implement a photographing function by using the ISP, the camera 193, the video codec, the GPU, the display 194, the application processor, and the like.

The ISP is configured to process data fed back by the camera 193. For example, during photographing, a shutter is pressed, and a ray of light is transmitted to a photosensitive element of a camera through a lens. An optical signal is converted into an electrical signal. The photosensitive element of the camera transmits the electrical signal to the ISP for processing, to convert the electrical signal into a visible image.

The camera 193 is configured to capture a static image or a video. An optical image of an object is generated through the lens, and the image is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the second electronic device 200 may include one or N cameras 193, where N is a positive integer greater than 1.

The digital signal processor is configured to process a digital signal, and in addition to a digital image signal, may further process another digital signal. For example, when the second electronic device 200 selects a frequency, the digital signal processor is configured to perform Fourier transform and the like on frequency energy.

The video codec is configured to compress or decompress a digital video. The second electronic device 200 may support one or more video codecs. Therefore, the second electronic device 200 may play or record videos in a plurality of coding formats, for example, moving picture experts group (moving picture experts group, MPEG)-1, MPEG-2, MPEG-3, and MPEG-4.

The NPU is a neural-network (NN) computing processor. The NPU quickly processes input information by referring to a structure of a biological neural network, for example, by referring to a transfer mode between human brain neurons, and can further continuously perform self-learning. The NPU can implement applications such as intelligent cognition of the second electronic device 200, for example, image recognition, facial recognition, speech recognition, and text understanding.

The external memory interface 120 may be configured to connect to an external storage card such as a micro SD card, to extend a storage capability of the second electronic device 200. The external storage card communicates with the processor 110 through the external memory interface 120, to implement a data storage function. For example, files such as music and a video are stored in the external storage card.

The internal memory 121 may be configured to store computer-executable program code, and the executable program code includes instructions. The processor 110 runs the instructions stored in the internal memory 121, to perform various function applications and data processing of the second electronic device 200. The internal memory 121 may include a program storage area and a data storage area. The program storage area may store an operating system, an application required by at least one function (for example, a sound playing function or an image playing function), and the like. The data storage area may store data (for example, audio data and a phone book) and the like created in a process of using the second electronic device 200. In addition, the internal memory 121 may include a high-speed random access memory, or may include a nonvolatile memory, for example, at least one magnetic disk storage device, a flash memory, or a universal flash storage (UFS).

The second electronic device 200 may implement audio functions such as music playing and recording functions by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may further be configured to encode and decode audio signals. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The second electronic device 200 may listen to music or answer a hands-free call by using the speaker 170A.

The receiver 170B, also referred to as an "earpiece", is configured to convert an audio electrical signal into a sound signal. When a call is answered or voice information is received by using the second electronic device 200, the receiver 170B may be put close to a human ear to listen to a voice.

The microphone 170C, also referred to as a "mike" or a "mic", is configured to convert a sound signal into an electrical signal. When making a call or sending voice information, a user may make a sound near the microphone 170C through the mouth of the user, to enter a sound signal to the microphone 170C. The second electronic device 200 may be provided with at least one microphone 170C.

The headset jack 170D is configured to connect to a wired headset. The headset jack 170D may be a USB interface 130, or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The second electronic device 200 determines pressure intensity based on the change of the capacitance. When a touch operation is performed on the display 194, the second electronic device 200 detects intensity of the touch operation by using the pressure sensor 180A. The second electronic device 200 may further calculate a position of the touch based on a detection signal of the pressure sensor 180A. In some embodiments, touch operations that are performed on a same touch position but have different touch operation intensity may correspond to different operation instructions.

The gyro sensor 180B may be configured to determine a motion posture of the second electronic device 200. In some embodiments, angular velocities of the second electronic device 200 around three axes (namely, axes x, y, and z) may be determined by using the gyro sensor 180B. The gyro sensor 180B may be configured to perform image stabilization during photographing.

The barometric pressure sensor 180C is configured to measure barometric pressure. In some embodiments, the second electronic device 200 calculates an altitude based on a barometric pressure value measured by the barometric pressure sensor 180C, to assist in positioning and navigation.

The magnetic sensor 180D includes a Hall effect sensor. The second electronic device 200 may detect opening and closing of a flip cover by using the magnetic sensor 180D. In some embodiments, when the second electronic device 200 is a flip phone, the second electronic device 200 can detect opening and closing of a flip cover by using the magnetic sensor 180D. Further, a feature such as automatic unlocking upon opening of the flip cover is set based on a detected opening or closing state of the flip cover.

The acceleration sensor 180E may detect magnitude of acceleration of the second electronic device 200 in various directions (usually on three axes). When the second electronic device 200 is static, a value and a direction of gravity may be detected. The acceleration sensor 180E may further be configured to recognize a posture of a terminal, and is applied in an application such as a pedometer or screen switching between a landscape mode and a portrait mode.

The distance sensor 180F is configured to measure a distance. The second electronic device 200 may measure the distance in an infrared manner or a laser manner. In some embodiments, in a photographing scenario, the second electronic device 200 may measure a distance by using the distance sensor 180F, to implement quick focusing.

The optical proximity sensor 180G may include, for example, a light-emitting diode (LED) and an optical detector such as a photodiode. The light-emitting diode may be an infrared light-emitting diode. The second electronic device 200 may emit infrared light by using the light-emitting diode. The second electronic device 200 detects reflected infrared light from a nearby object by using the photodiode. When sufficient reflected light is detected, it may be determined that there is an object near the second electronic device 200. When insufficient reflected light is detected, the second electronic device 200 may determine that there is no object near the second electronic device 200. The second electronic device 200 may detect, by using the optical proximity sensor 180G, that a user holds the second electronic device 200 close to an ear for a call, to automatically turn off a screen to save power. The optical proximity sensor 180G may also be used in a flip cover mode or a pocket mode to automatically unlock or lock the screen.

The ambient light sensor 180L is configured to sense ambient light brightness. The second electronic device 200 may adaptively adjust brightness of the display 194 based on the sensed ambient light brightness. The ambient light sensor 180L may further be configured to automatically adjust white balance during photographing. The ambient light sensor 180L may further cooperate with the optical proximity sensor 180G to detect whether the second electronic device 200 is in a pocket, to avoid an accidental touch.

The fingerprint sensor 180H is configured to collect a fingerprint. The second electronic device 200 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the second electronic device 200 executes a temperature processing policy based on the temperature detected by the temperature sensor 180J. For example, when the temperature reported by the temperature sensor 180J exceeds a threshold, the second electronic device 200 lowers performance of a processor near the temperature sensor 180J, to reduce power consumption and implement thermal protection. In some other embodiments, when the temperature is less than another threshold, the second electronic device 200 heats the battery 142, to avoid an abnormal shutdown of the second electronic device 200 due to a low temperature. In some other embodiments, when the temperature is less than still another threshold, the second electronic device 200 boosts an output voltage of the battery 142, to avoid an abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. A visual output related to the touch operation may be provided on the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse to receive a blood pressure beating signal. In some embodiments, the bone conduction sensor 180M may alternatively be disposed in a headset, to obtain a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch-sensitive button. The second electronic device 200 may receive button input, and generate button signal input related to user settings and function control of the second electronic device 200.

The motor 191 may generate a vibration prompt. The motor 191 may be configured to provide an incoming call vibration prompt or a touch vibration feedback. For example, touch operations performed on different applications (for example, photographing and audio playing) may correspond to different vibration feedback effects. For touch operations performed on different areas on the display 194, the motor 191 may also correspond to different vibration feedback effects. Different application scenarios (for example, a time reminder, information receiving, an alarm clock, and a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the second electronic device 200. The second electronic device 200 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type, or may be of different types. The SIM card interface 195 may also be compatible with different types of SIM cards. The SIM card interface 195 may also be compatible with the external storage card. The second electronic device 200 interacts with a network by using the SIM card, to implement functions such as calling and data communication. In some embodiments, the second electronic device 200 uses an eSIM, namely, an embedded SIM card. The eSIM card may be embedded in the second electronic device 200, and cannot be separated from the second electronic device 200.

A software system of the second electronic device 200 may use a layered architecture, an event-driven architecture, a microkernel architecture, a micro service architecture, or a cloud architecture. In embodiments of the present disclosure, an Android system of a layered architecture is used as an example to describe a software structure of the second electronic device 200.

Figure 2B:
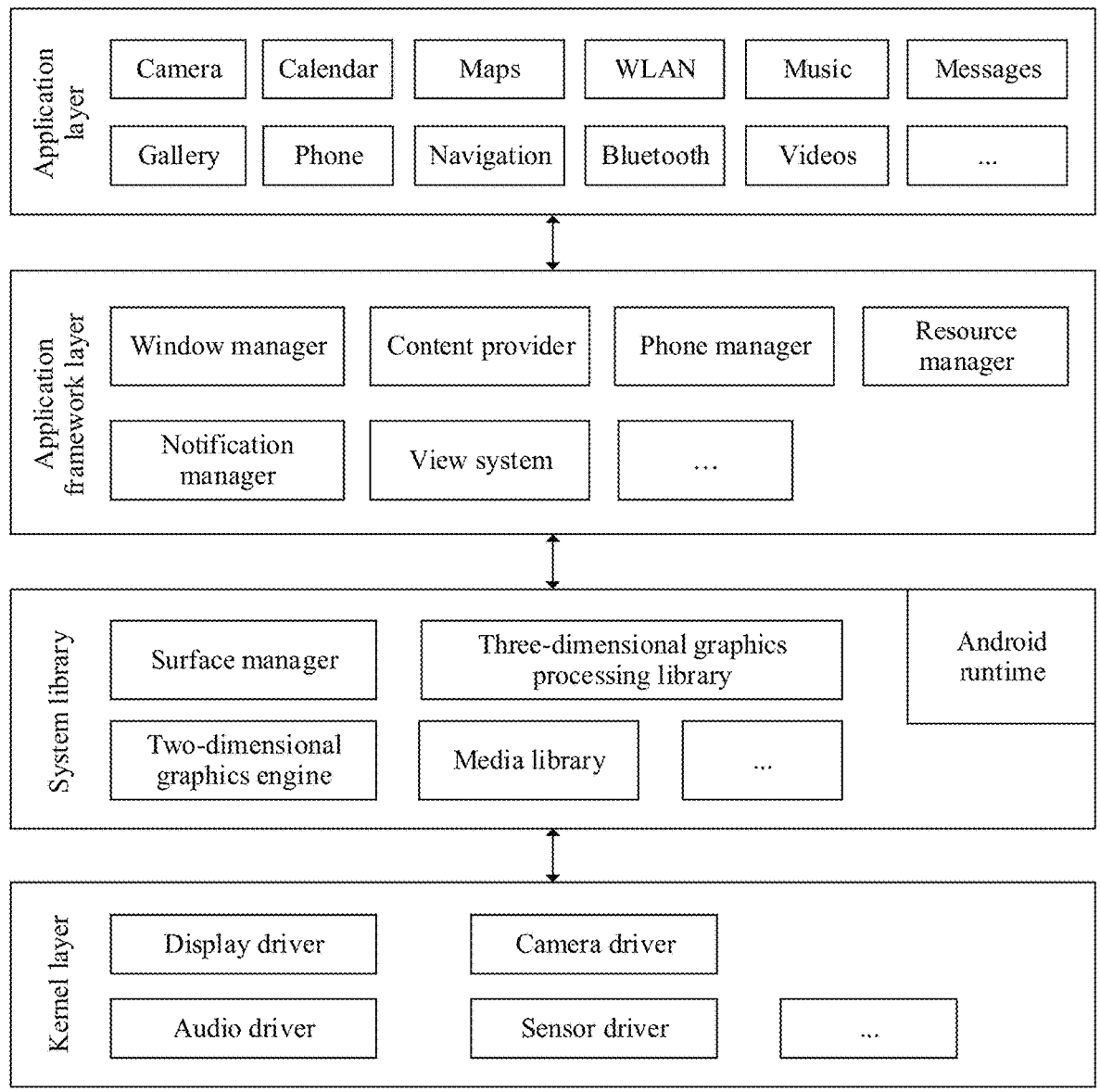
FIG. 2B is a block diagram of a software structure of a second electronic device 200 according to an embodiment of this application.

FIG. 2B is a block diagram of a software structure of a second electronic device 200 according to an embodiment of this application.

In a layered architecture, software is divided into several layers, and each layer has a clear role and task. The layers communicate with each other through a software interface. In some embodiments, an Android system is divided into four layers from top to bottom: an application layer, an application framework layer, an Android runtime and system library, and a kernel layer.

The application layer may include a series of application packages.

As shown in FIG. 2B, the application packages may include applications such as Camera, Gallery, Calendar, Phone, Maps, Navigation, WLAN, Bluetooth, Music, Videos, and Messages.

The application framework layer provides an application programming interface (API) and a programming framework for an application at the application layer. The application framework layer includes some predefined functions.

As shown in FIG. 2B, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, a phone book, and the like.

The view system includes visual controls such as a control for displaying a text and a control for displaying an image. The view system may be configured to construct an application. A display interface may include one or more views. For example, a display interface including a Messages notification icon may include a text display view and an image display view.

The phone manager is configured to provide a communication function of the second electronic device 200, for example, management of a call status (including answering, declining, or the like).

The resource manager provides an application with various resources such as a localized character string, an icon, an image, a layout file, and a video file.

The notification manager enables an application to display notification information in a status bar, and may be configured to convey a notification-type message. The displayed notification information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background, or may be a notification that appears on a screen in a form of a dialog window. For example, text information is displayed in the status bar, an alert sound is played, the electronic device vibrates, or an indicator light blinks.

The Android runtime includes a kernel library and a virtual machine. The Android runtime is responsible for scheduling and management of the Android system.

The kernel library includes two parts: a function that needs to be invoked in Java language, and a kernel library of Android.

The application layer and the application framework layer run in the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager, a media library (or Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

In embodiments of this application, for a hardware structure and a software system of the first electronic device 100, refer to the hardware structure and the software system of the second electronic device 200 shown in FIG. 2A and FIG. 2B. Details are not described herein again.

Figure 3:
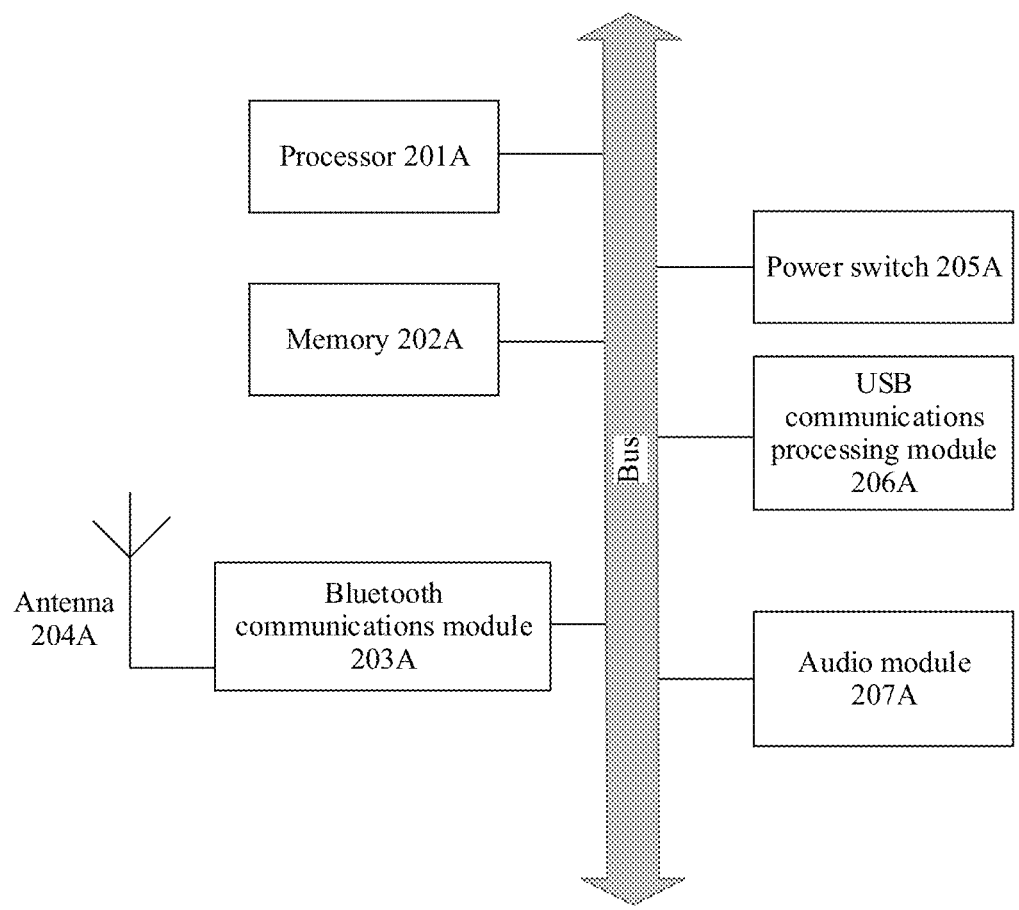
FIG. 3 is a schematic diagram of a structure of a fourth electronic device 400 according to an embodiment of this application.

FIG. 3 is a schematic diagram of a structure of a fourth electronic device 400 according to an embodiment of this application. The fourth electronic device 400 may be a smart speaker.

The following describes the fourth electronic device 400. It should be understood that the fourth electronic device 400 shown in FIG. 3 is merely an example, and the fourth electronic device 400 may have more or fewer components than those shown in FIG. 3, may combine two or more components, or may have different component configurations. The components shown in the figure may be implemented in hardware including one or more signal processing and/or application-integrated circuits, software, or a combination of hardware and software.

As shown in FIG. 3, the fourth electronic device 400 may include a processor 201A, a memory 202A, a communications module 203A, an antenna 204A, a power switch 205A, a USB communications processing module 206A, and an audio module 207A.

The processor 201A may be configured to read and execute computer readable instructions. In implementation, the processor 201A may mainly include a controller, an arithmetic unit, and a register. The controller is mainly responsible for decoding instructions and sending a control signal for an operation corresponding to the instructions. The arithmetic unit is mainly responsible for storing a register operand, an intermediate operation result, and the like that are temporarily stored during instruction execution. In implementation, a hardware architecture of the processor 201A may be an application-integrated circuit (ASIC) architecture, an MIPS architecture, an ARM architecture, an NP architecture, or the like.

In some embodiments, the processor 201A may be configured to parse a signal received by the communications processing module 203A, for example, a call request sent by a first electronic device 100. The processor 201A may be configured to perform a processing operation based on a parsing result, such as invoking the audio module 207A to output a voice prompt, for example, output a voice "A family member is calling. Please choose to answer or hang up . . . ".

The memory 202A is coupled to the processor 201A, and is configured to store various software programs and/or a plurality of sets of instructions. In implementation, the memory 202A may include a high-speed random access memory, and may also include a nonvolatile memory, such as one or more magnetic disk storage devices, a flash memory device, or another nonvolatile solid-state storage device. The memory 202A may store an operating system, for example, an embedded operating system such as uCOS, VxWorks, or RTLinux. The memory 202A may further store a communications program, and the communications program may be used to communicate with the first electronic device 100, a server 500, or another device.

The communications module 203A may provide a wireless communication solution that includes a WLAN (for example, a Wi-Fi network), a BR/EDR, BLE, a GNSS, FM, and the like and that is applied to the fourth electronic device 400. In some embodiments, the communications module 203A may obtain, through listening, a signal transmitted by another device (for example, the first electronic device 100), such as a detection request, and may send a response signal and the like, so that the another device (for example, the first electronic device 100) can discover the fourth electronic device 400. In this way, the fourth electronic device 400 communicates with the another device (for example, the first electronic device 100) through Wi-Fi.

In some other embodiments, the communications module 203A may further transmit a signal, so that another device (for example, the first electronic device 100) can discover the fourth electronic device 400. In this way, the fourth electronic device 400 communicates with the another device (for example, the first electronic device 100) through Bluetooth or Wi-Fi.

A wireless communication function of the fourth electronic device 400 may be implemented through the antenna 204A, the communications module 203A, the modem processor, and the like.

The antenna 204A may be configured to transmit and receive electromagnetic wave signals. Each antenna of the fourth electronic device 400 may be configured to cover one or more communication frequency bands.

In some embodiments, the communications module 203A may have one or more antennas.

The power switch 205A may be configured to control a power supply to supply power to the fourth electronic device 400.

The USB communications processing module 206A may be configured to communicate with another device through a USB interface (not shown).

The audio module 207A may be configured to output an audio signal through an audio output interface. The audio module 207A may further be configured to receive audio data through an audio input interface. The fourth electronic device 400 may be a media device such as a smart speaker.

Not limited to the smart speaker, in some embodiments, the fourth electronic device 400 may alternatively be a tablet computer, a smart television, or the like. In this case, the fourth electronic device 400 may further include a display (not shown), where the display may be configured to display an image, prompt information, and the like. The display may be a liquid crystal display (LCD), an organic light-emitting diode (OLED) display, an active-matrix organic light emitting diode (AMOLED) display, a flexible light-emitting diode (FLED) display, a quantum dot light emitting diode (QLED) display, or the like.

Alternatively, when the fourth electronic device 400 may be a tablet computer, a smart television, or the like, in some embodiments, the fourth electronic device 400 may further include a serial interface such as an RS-232 interface. The serial interface may be connected to another device, for example, an audio speaker device such as a smart speaker, so that the fourth electronic device 400 collaborates with the audio speaker device to play audio and a video.

It may be understood that the structure shown in FIG. 3 does not constitute any limitation on the fourth electronic device 400. In some other embodiments of this application, the fourth electronic device 400 may include more or fewer components than those shown in the figure, or combine some components, or split some components, or have different component arrangements. The components shown in the figure may be implemented by hardware, software, or a combination of software and hardware.

In embodiments of this application, for a schematic diagram of a structure of the third electronic device 300, refer to the descriptions of the schematic diagram of the structure of the fourth electronic device 400 shown in FIG. 3, and the third electronic device 300 includes more or fewer components than those described in FIG. 3. Details are not described herein again.

To improve call convenience, an embodiment of this application provides a call method. In the call method, a first account is associated with a plurality of called party devices. A calling party device may call the plurality of called party devices by using the first account. When receiving calling, a called party device that is difficult to carry, such as a smart speaker or a smart television, may detect whether a distance between the smart speaker or the smart television and a smartwatch or a mobile phone is less than a distance threshold, namely, a specified threshold. If the distance between the smart speaker or the smart television and the smartwatch or the mobile phone is less than the distance threshold, the smart speaker or the smart television may output an incoming call prompt. If the distance between the smart speaker or the smart television and the smartwatch or the mobile phone is not less than the distance threshold, the smart speaker or the smart television ignores the received calling, and make no response to the calling.

Generally, the smartwatch or the mobile phone is a device carried by a user. Therefore, location information of the smartwatch or the mobile phone may represent location information of the user. However, the smart speaker or the smart television is usually not carried by the user. In this case, the smart speaker outputs an incoming call prompt only when it is detected that a distance between the smart speaker and the smartwatch or the mobile phone is within a range. This can reduce a case in which the incoming call prompt interferes with another person or the incoming call prompt is mistakenly answered by another person when the smart speaker outputs the incoming call prompt but the user is not near the smart speaker. Therefore, convenience of calling a plurality of devices can be improved.

The following describes a process of associating an account with a device on a user interface. An embodiment of this application is described by using an example in which a first account is associated with called party devices, that is, the first account is associated with a second electronic device 200 (for example, Rachel's mobile phone), a third electronic device 300 (for example, a smartwatch), and a fourth electronic device 400 (for example, a smart speaker).

In embodiments of this application, the first account is, for example, a Huawei account, and the Huawei account may correspond to a mobile phone number "136********" corresponding to a SIM card installed on the second electronic device 200. A speaker application (APP) corresponding to the smart speaker may be installed on the second electronic device 200. AI Speaker on the second electronic device 200 may be logged in to by using the first account. The second electronic device 200 responds to a user operation on a user interface corresponding to the speaker application, and associates the first account with the smart speaker.

Huawei Wear corresponding to the smartwatch may also be installed on the second electronic device 200. Huawei Wear on the second electronic device 200 may also be logged in to by using the first account. The second electronic device 200 responds to a user operation in a user interface corresponding to Huawei Wear, and associates the first account with the smartwatch.

In this embodiment of this application, an example in which the first account "136********" is associated with user Rachel's mobile phone, speaker, and watch is used for description.

Figure 4A:
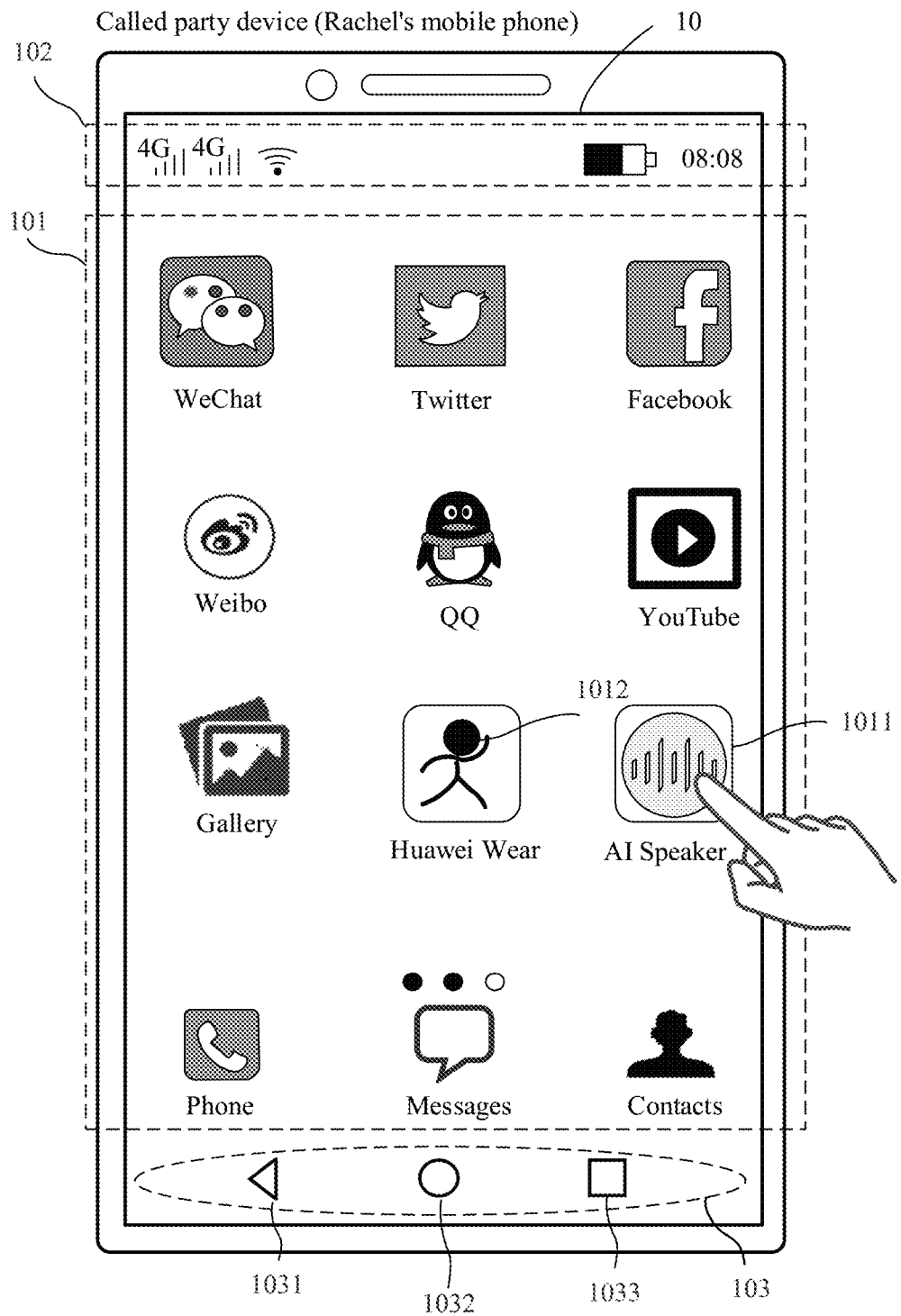
FIG. 4A to FIG. 4J are schematic diagrams of some user interfaces according to an embodiment of this application.

First, a user interface related to association of the first account with the fourth electronic device 400 (the smart speaker) is described. FIG. 4A to FIG. 4J are schematic diagrams of some user interfaces according to an embodiment of this application. As shown in FIG. 4A, the second electronic device 200 (namely, Rachel's mobile phone) may display a home screen 10. The screen 10 includes an application icon 101, a status bar 102, and a navigation bar 103.

The application icon 101 may include, for example, a WeChat (WeChat) icon, a Twitter (Twitter) icon, a Facebook (Facebook) icon, a Sina Weibo (Sina Weibo) icon, a QQ (Tencent QQ) icon, a YouTube (YouTube) icon, a Gallery (Gallery) icon, a Huawei Wear icon 1012, and an AI Speaker icon 1011, and may further include an icon of another application. This is not limited in embodiments of this application. An icon of any application may be for responding to a user operation, for example, a touch operation, so that the first electronic device 100 enables the application corresponding to the icon.

The status bar 102 may include an operator name (for example, China Mobile), time, a Wi-Fi icon, signal strength, and a current battery level. The status bar 102 may further include a Bluetooth icon.

The navigation bar 103 may include system navigation buttons such as a back button 1031, a home screen (home screen) button 1032, and a recent apps button 1033. The home screen 10 is an interface displayed by the first electronic device 100 after a user operation performed on the home screen button 1032 is detected in any user interface. When it is detected that a user taps the back button 1031, the first electronic device 100 may display a previous user interface of a current user interface. When detecting that the user taps the home screen button 1032, the second electronic device 200 may display the home screen 10. When it is detected that the user taps the recent apps button 1033, the second electronic device 200 may display a task recently enabled by the user. The navigation buttons may alternatively have other names. For example, 1031 may be referred to as a back button, 1032 may be referred to as a home button, and 1033 may be referred to as a menu button. This is not limited in this application. Each navigation button in the navigation bar 103 is not limited to a virtual button, and may alternatively be implemented as a physical button.

Figure 4B:
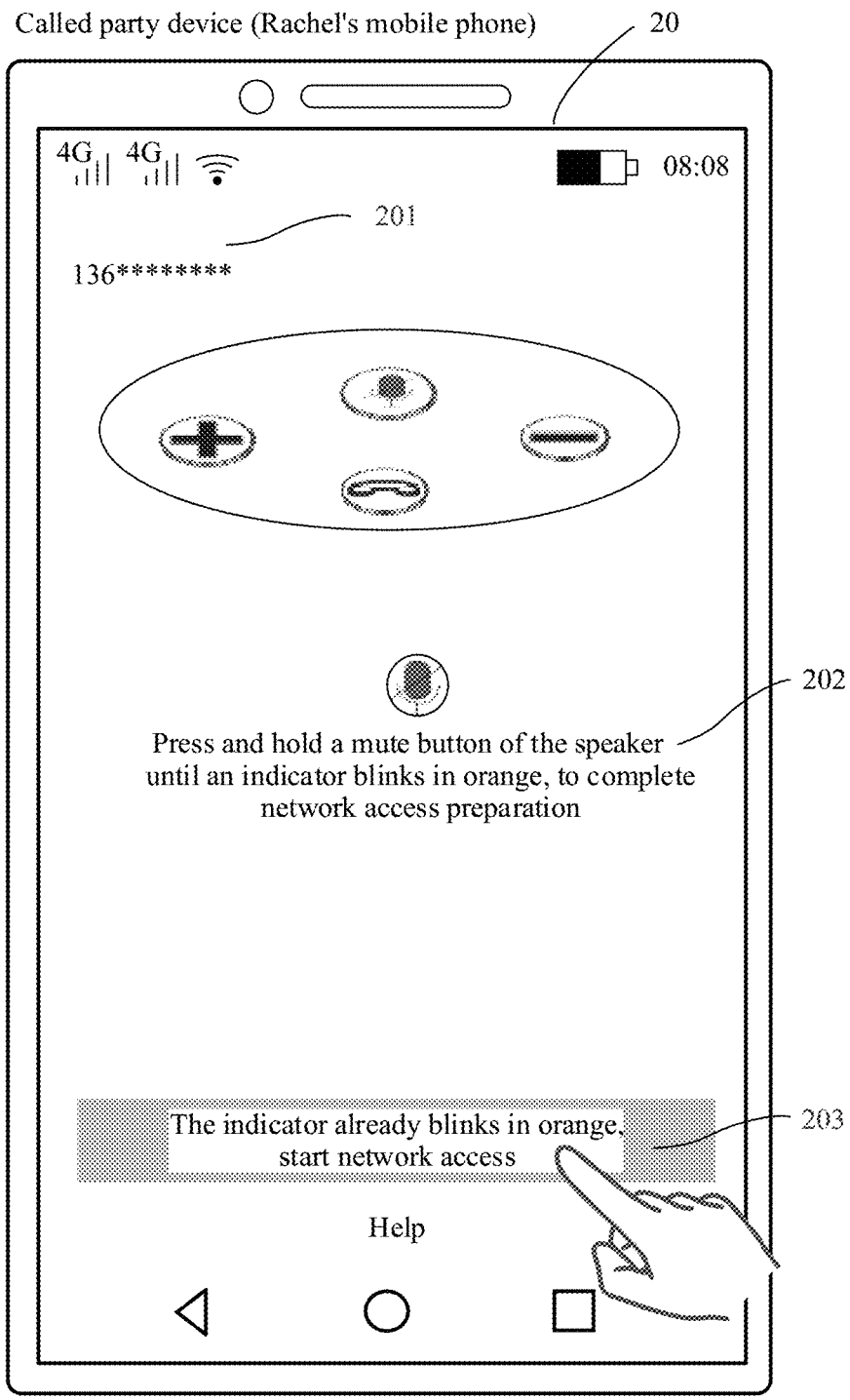

The second electronic device 200 may receive a user operation performed on the AI Speaker icon 1011, for example, a touch operation. In response to the user operation, the first electronic device 100 may display a user interface 20. As shown in FIG. 4B, the user interface 20 may include an account indication 201, a prompt 202, and a control 203.

The account indication 201 may indicate a login account of AI Speaker, for example, the first account "136********" for login. In embodiments of this application, AI Speaker is a first application. Huawei Wear in the foregoing and the following descriptions is a second application.

The first account is, for example, a Huawei account. When an application in the second electronic device 200 is logged in to by using the Huawei account, the second electronic device 200 may log in to AI Speaker by using the Huawei account. The first account corresponds to an account server. The second electronic device 200 registers the first account with the account server, and may further set a login password corresponding to the first account during registration. After the registration is completed, the user may enter the first account and the corresponding login password on an application interface of AI Speaker in the second electronic device 200. The second electronic device 200 may send a login request to the account server. After receiving the request, the account server performs verification on the first account and the corresponding login password, and allows the first account to log in to AI Speaker on the second electronic device 200 after the verification succeeds.

The prompt 202 may prompt an operation that needs to be performed on the smart speaker. For example, as shown in FIG. 4B, the prompt is as follows: Press and hold a mute button of the speaker until an indicator blinks in orange, to complete network access preparation.

The control 203 may include a prompt "the indicator blinks in orange, start network access".

The user may operate the smart speaker (that is, the fourth electronic device 400) according to the prompt 202 on the user interface 20, that is, press and hold the mute button on the smart speaker until the indicator blinks in orange. Then, in response to a user operation, for example, a touch operation, performed on the control 203, the second electronic device 200 may scan the smart speaker 400.

Figure 4C:
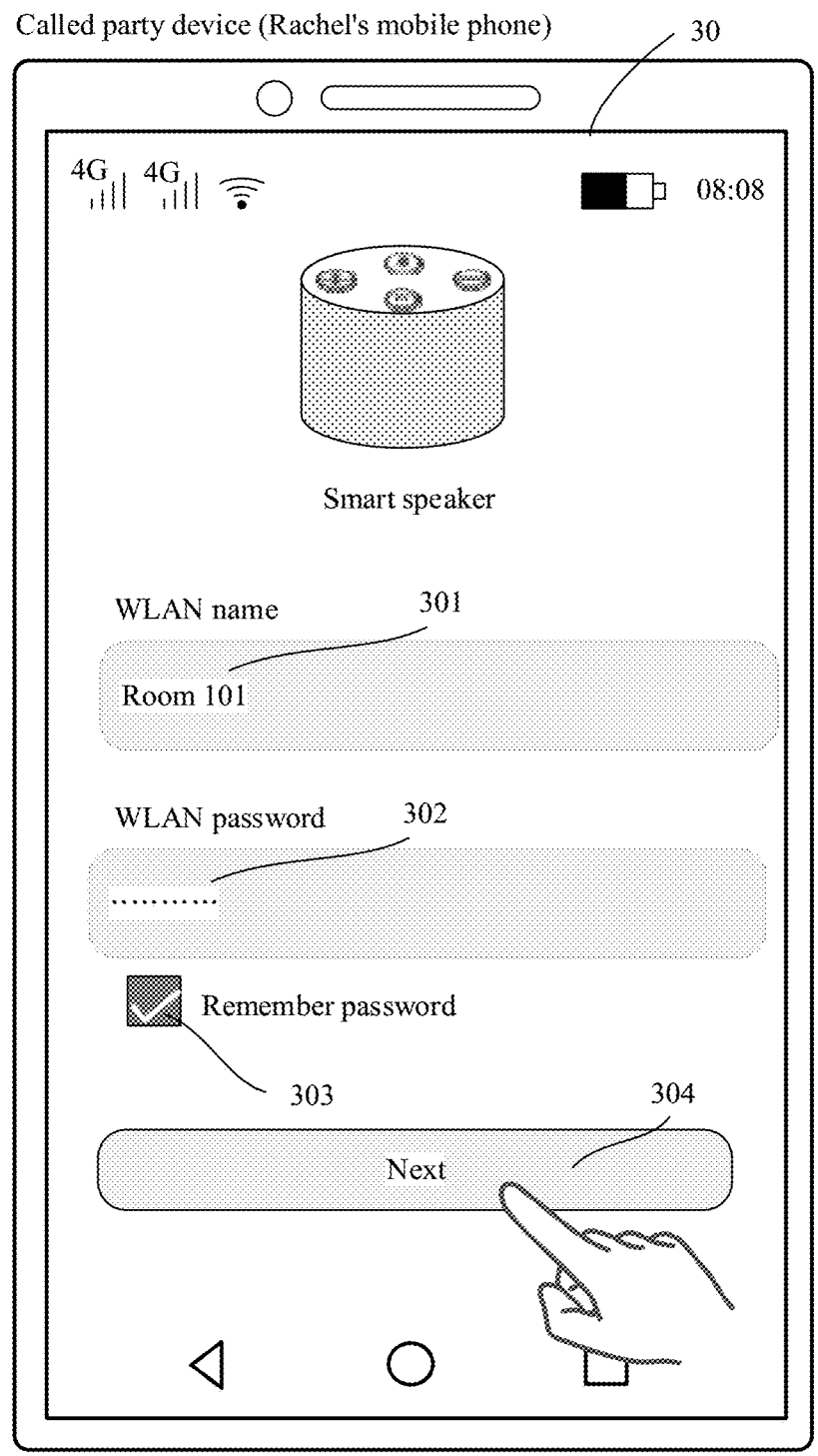

For example, a Bluetooth scanning function is used for scanning. Specifically, the second electronic device 200 may scan, through Bluetooth, a signal broadcast by the smart speaker 400. After the smart speaker 400 is found through scanning, as shown in FIG. 4C, the second electronic device 200 displays a user interface 30. The signal broadcast by the smart speaker 400 may include a MAC address of the smart speaker 400. The MAC address may be used by the second electronic device 200 to transmit network access information to the smart speaker 400, and the network access information may include a Wi-Fi name and a corresponding password.

The user interface 30 may include a WLAN name input box 301, a WLAN password input box 302, a "remember password" option 303, and a "next" control 304.

The WLAN name input box 301 and the WLAN password input box 302 may be respectively used to input a Wi-Fi name "room 101" and a corresponding password. The Wi-Fi name may be a service set identifier (SSID) of a Wi-Fi hotspot.

In response to a user operation, such as a touch operation, performed on the "remember password" option 303, the "remember password" option 303 is displayed in a selected state. When subsequently using the Wi-Fi network named "room 101", an electronic device may obtain the corresponding password without user input.

Figure 4D:
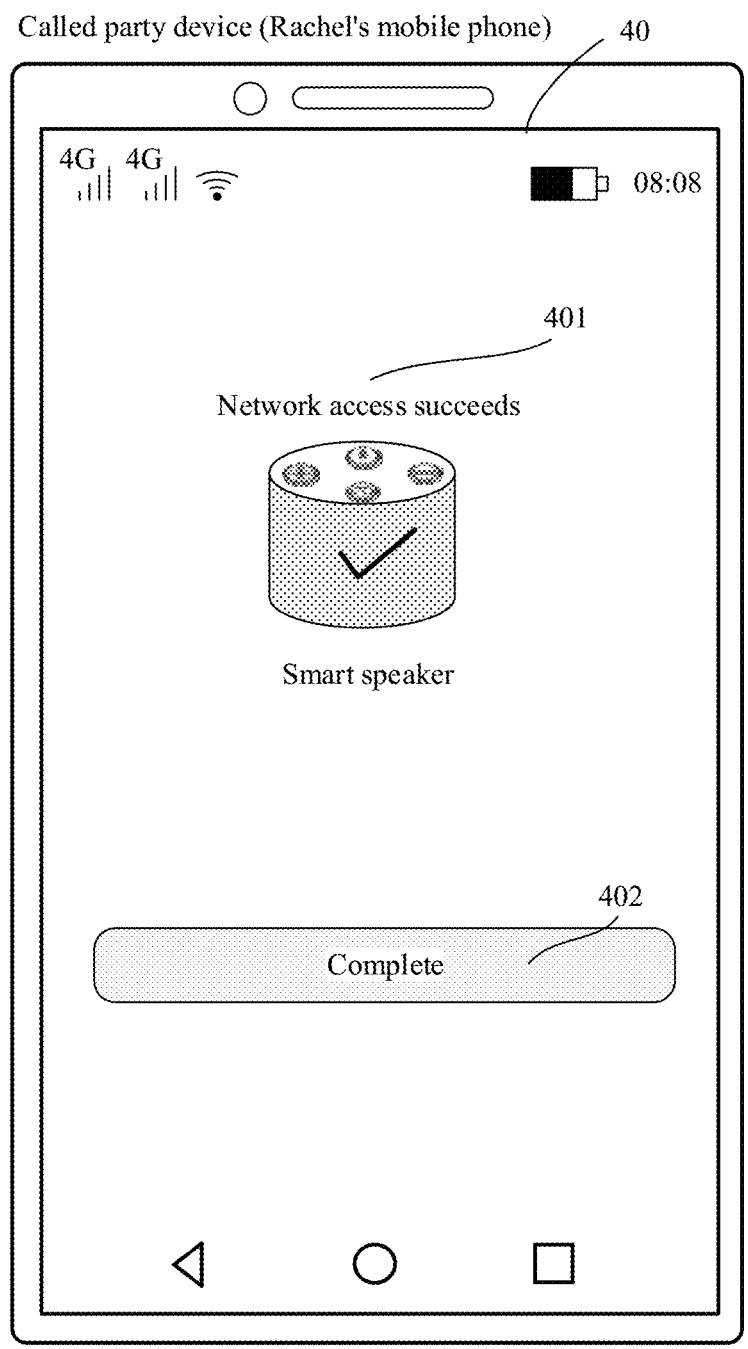

In response to a user operation, such as a touch operation, performed on the "next" control 304, the second electronic device 200 sends the network access information to the smart speaker 400. For example, the second electronic device 200 may send the network access information to the smart speaker 400 according to the MAC address carried in a broadcast of the smart speaker 400. The network access information includes, for example, the Wi-Fi name and the corresponding password. The second electronic device 200 may be connected to the Wi-Fi named "room 101". The smart speaker 400 may also be connected to the Wi-Fi named "room 101" according to the network access information, to establish a Wi-Fi connection between the second electronic device 200 and the smart speaker 400. As shown in FIG. 4D, after the Wi-Fi connection between the second electronic device 200 and the smart speaker 400 is completed, the second electronic device 200 may display a user interface 40. The user interface 40 includes a "network access succeed" prompt 401 and a "complete" control 402.

In this embodiment of this application, an example in which a Wi-Fi connection is established between the second electronic device 200 and the smart speaker 400 is used for description. It may be understood that the connection is not limited to the Wi-Fi connection, and may alternatively be another short-range wireless connection, for example, a Bluetooth connection. The foregoing process of establishing the short-range wireless communication connection between the second electronic device 200 and the smart speaker 400 through Bluetooth broadcast and Wi-Fi is merely used to explain this embodiment of this application, and should not be construed as a limitation.

After the second electronic device 200 establishes the Wi-Fi connection to the smart speaker 400, the first account may be associated with the smart speaker 400. The following describes a process in which the first account may be associated with the smart speaker 400.

Figure 4E:
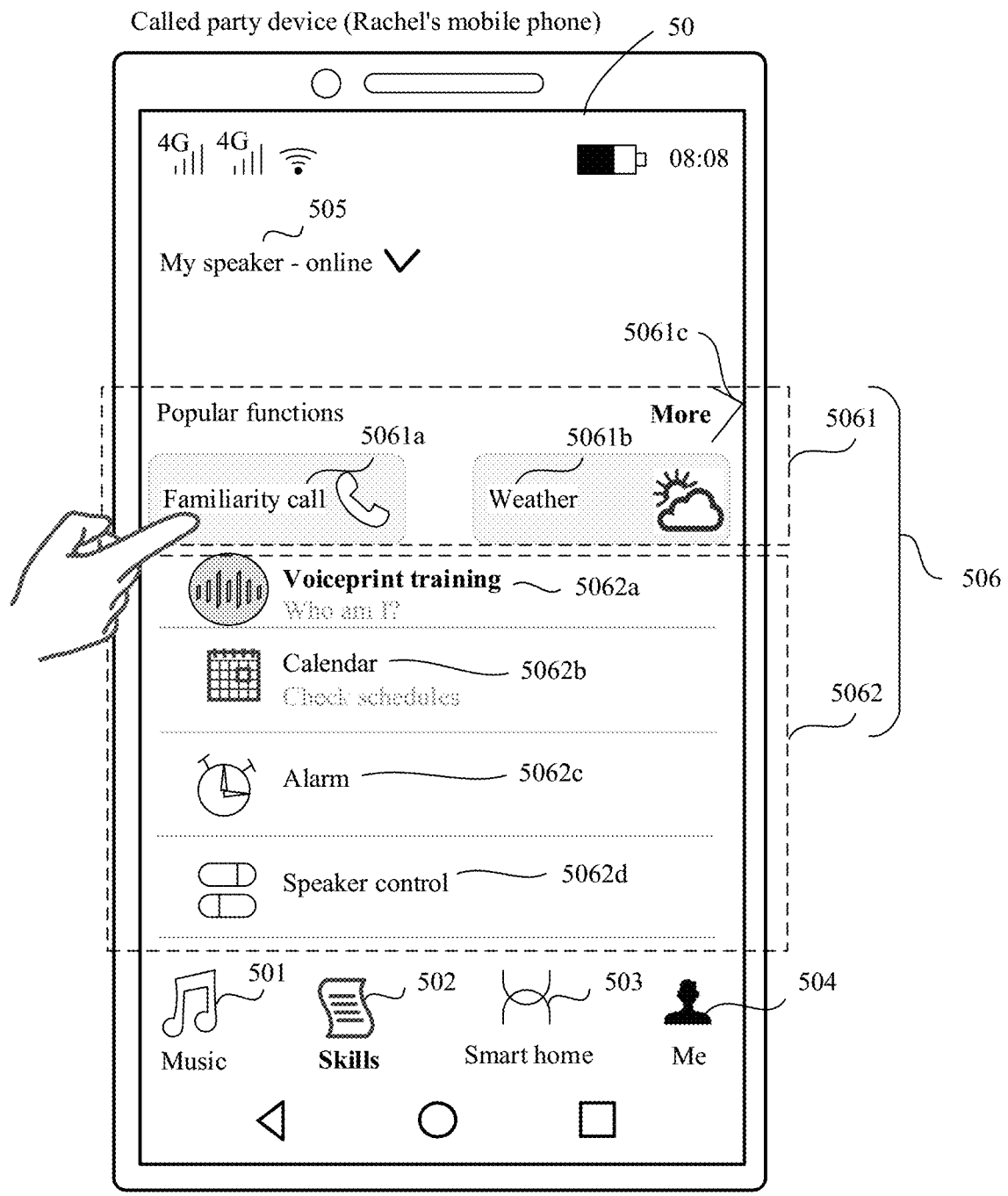

As shown in FIG. 4D and FIG. 4E, after the second electronic device 200 establishes the Wi-Fi connection to the smart speaker 400, the second electronic device 200 may display a user interface 50 in response to a user operation performed on the "complete" control 402. The user interface 50 may include menu controls ("music" 501, "skills" 502, "smart home" 503, and "me" 504), a speaker identifier 505, and a content display area 506. Content displayed in the content display area varies with the menu controls. A currently selected menu type shown in FIG. 4E is "skills" 502. In other words, the content displayed in the content display area 506 is content in a menu of "skills" 502.

A content display area corresponding to "me" 504 may include a login account of the speaker application. For example, the login account is the first account "136********".

The speaker identifier 505 may be used to indicate an identifier of the smart speaker 400 and a current connection status between the smart speaker 400 and the second electronic device 200. For example, the identifier of the smart speaker and the connection status shown in FIG. 4E are "my speaker-online".

The content display area 506 may display a function list. The function list includes a popular function list 5061 and another function list 5062.

The popular function list 5061 may include a plurality of function options. For example, the popular function list 5061 shown in FIG. 4E includes a "familiarity call" option 5061*a* and a "weather" option 5061*b*. The popular function list 5061 may further include a "more" option 5061*c*.

In response to a user operation, for example, a touch operation on the "familiarity call" option 5061*a*, the "familiarity call" option 5061*a* may be used to set user information for making a call on the smart speaker 400. The user information is, for example, a user name, a number, or a role. For details, refer to descriptions of FIG. 4F to FIG. 4G.

In response to a user operation, the "weather" option 5061*b* may be used to set information for checking weather on the smart speaker 400. The information for checking weather includes, for example, a location, and a time point of automatic weather broadcast.

The "more" option 5061*c* is used to display more popular function options in response to a user operation.

The another function list 5062 may include a plurality of function options. For example, the another function list 5062 shown in FIG. 4E includes a "voiceprint training" option 5062*a*, a "calendar" option 5062*b*, an "alarm" option 5062*c*, and a "speaker control" option 5062*d*. It may be understood that this application is not limited to the foregoing function options, and may further include another function option.

Optionally, the second electronic device 200 may display more function options in response to a touch and slide operation performed by the user on the another function list 5062.

Figure 4F:
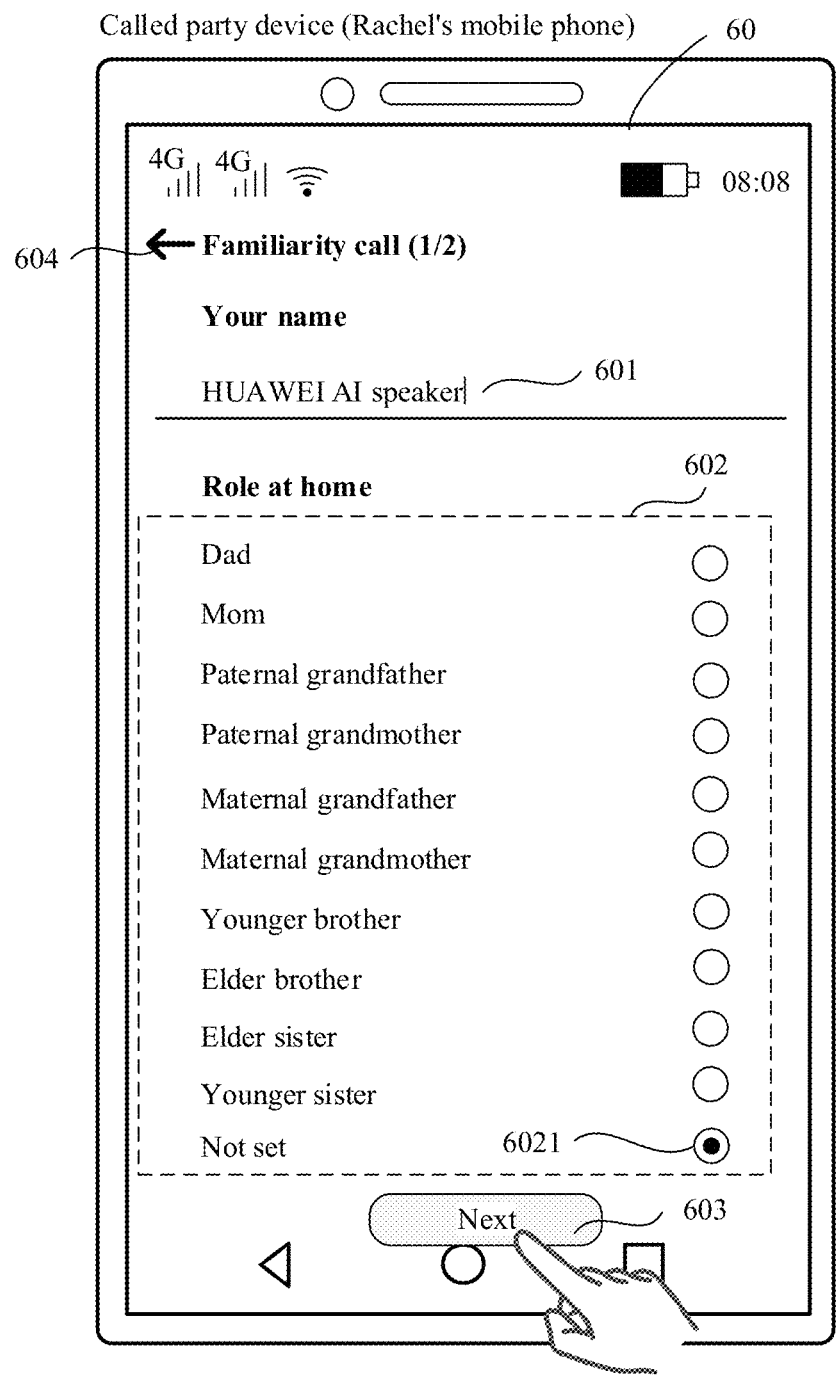
Figure 4G:
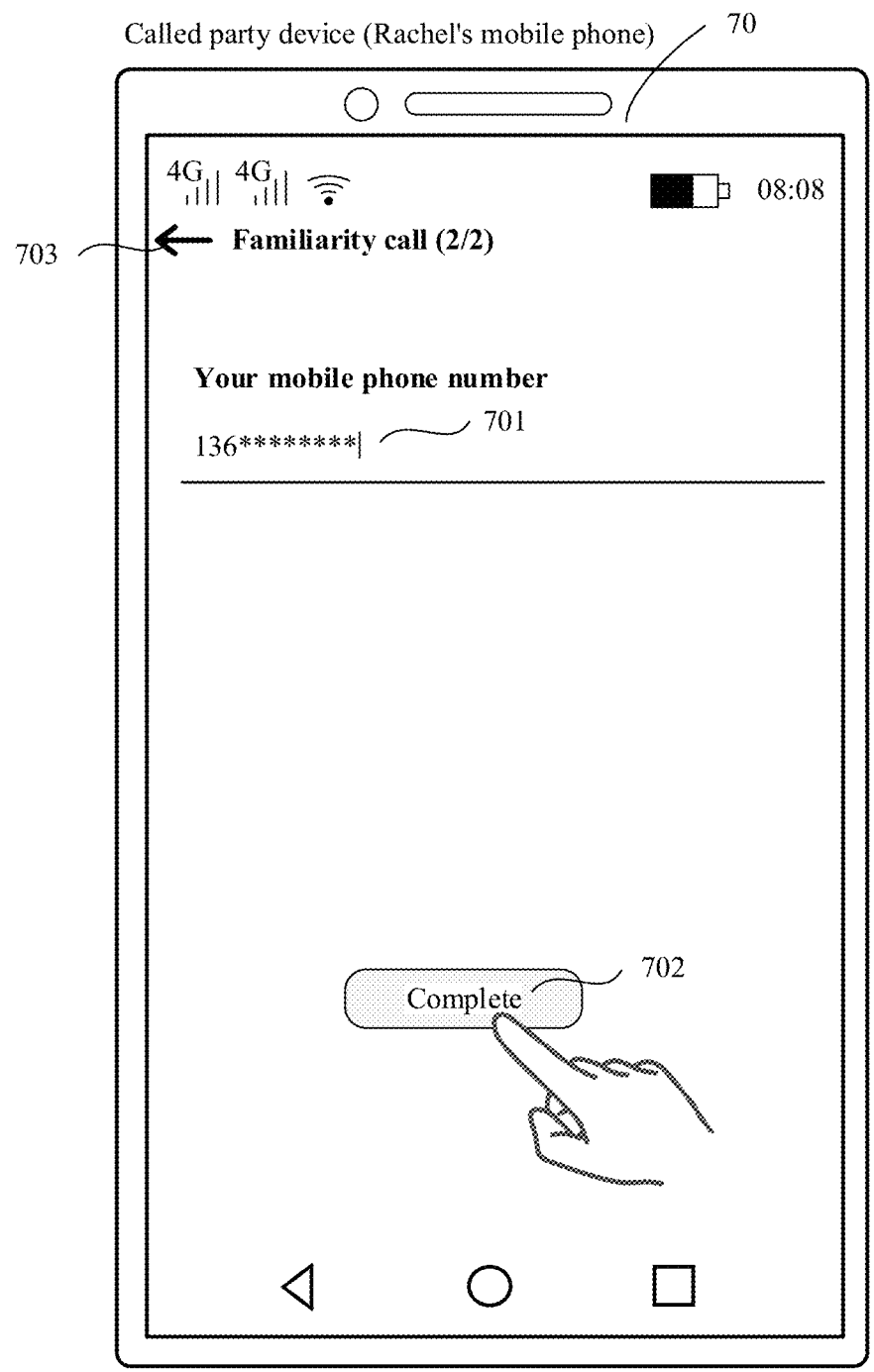

The second electronic device 200 may associate the first account with the smart speaker on the user interfaces in FIG. 4F and FIG. 4G in response to a user operation. Specifically, the second electronic device 200 may display a user interface 60 in response to a user operation, for example, a touch operation, performed on the "familiarity call" option 5061*a*. The user interface 60 may include a speaker name input box 601, a role option area 602, a "next" control 603, and a "back" control 604.

The speaker name input box 601 may be used to set a name for the speaker, for example, HUAWEI AI speaker. The role option area 602 may include a plurality of role options, for example, a "father" option, a "mother" option, ..., and a "not set" option 6021. For example, as shown in FIG. 4F, in the plurality of role options, the "not set" option 6021 is displayed in a selected state. The "back" control 604 is used to back to an upper-level interface. For example, the second electronic device 200 displays the user interface 50 in response to a user operation performed on the "back" control 604.

The second electronic device 200 displays a user interface 70 in response to a user operation performed on the "next" control 603. As shown in FIG. 4G, the user interface 70 may include a mobile phone number input box 701, a "complete" control 702, and a "back" control 703.

The account input box 701 is used for entering of the first account associated with the smart speaker 400. For example, the first account is "136********". In response to a user operation performed on the "complete" control 702, the smart speaker 400 or the second electronic device 200 may store an association relationship between the first account and a device identifier of the smart speaker 400. The "back" control 703 is used to back to an upper-level interface.

The association relationship between the first account and the device identifier of the smart speaker 400 may be sent by the second electronic device 200 or the smart speaker 400 to a server 500. An occasion for sending the association relationship to the server 500 is not limited in embodiments of this application. In an example, in response to a user operation performed on the "complete" control 702, the smart speaker 400 or the second electronic device 200 may send the association relationship between the first account and the device identifier of the smart speaker 400 to the server 500, or may send an association relationship between the first account and a device identifier of the second electronic device 200 to the server 500. In another example, when detecting that AI Speaker is logged in to by using the first account, the second electronic device 200 may send the association relationship between the first account and the device identifier of the smart speaker 400, and the association relationship between the first account and the device identifier of the second electronic device 200 to the server 500.

Figure 4H:
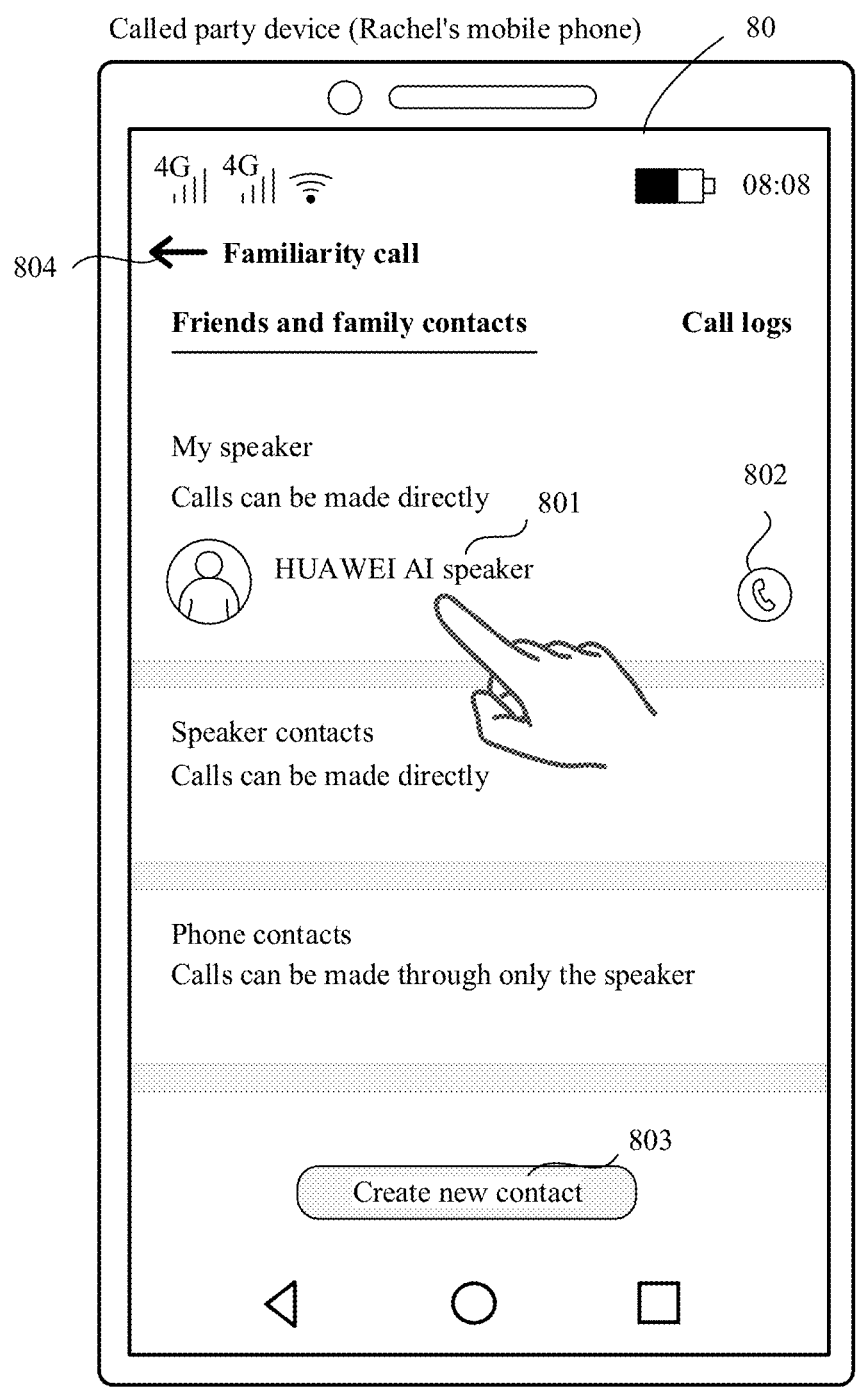

After the association relationship between the first account and the smart speaker 400 is established, the second electronic device 200 may display a user interface 80. As shown in FIG. 4H, the user interface 80 may include a "friends and family contacts" tab and a "call logs" tab. The "friends and family contacts" tab may include a "my speaker" list, a "speaker contacts" list, and a "phone contacts" list, as well as a back control 804 (similar to the control 703 above). These lists are used to display contacts of the smart speaker 400. The contacts of the smart speaker may be added by using a "create new contact" control 803. The added contact may be stored on a server corresponding to the smart speaker 400. When receiving a call request (for example, a voice signal used for calling), the smart speaker 400 may perform calling based on the contact stored on the server. After the association relationship between the first account and the smart speaker 400 is established, as shown in FIG. 4H, the "my speaker" list may include a "speaker" option 801 and a "dial" control 802. The "dial" control may be used to initiate calling to the smart speaker 400.

The "create new contact" control 803 is used to add a speaker contact and a mobile phone contact. After the speaker contact and the mobile phone contact are added, the smart speaker 400 may initiate calling to the added speaker contact and the added mobile phone contact, or receive calling initiated by the speaker contact and the mobile phone contact. Specifically, the added contact may be stored on the server corresponding to the smart speaker 400. When receiving a call request (for example, a voice signal used for calling), the smart speaker 400 may perform calling based on the contact stored on the server.

The user interface 80 may further include a "back" control 801, used to back to an upper-level interface of the user interface 80.

Figure 4I:
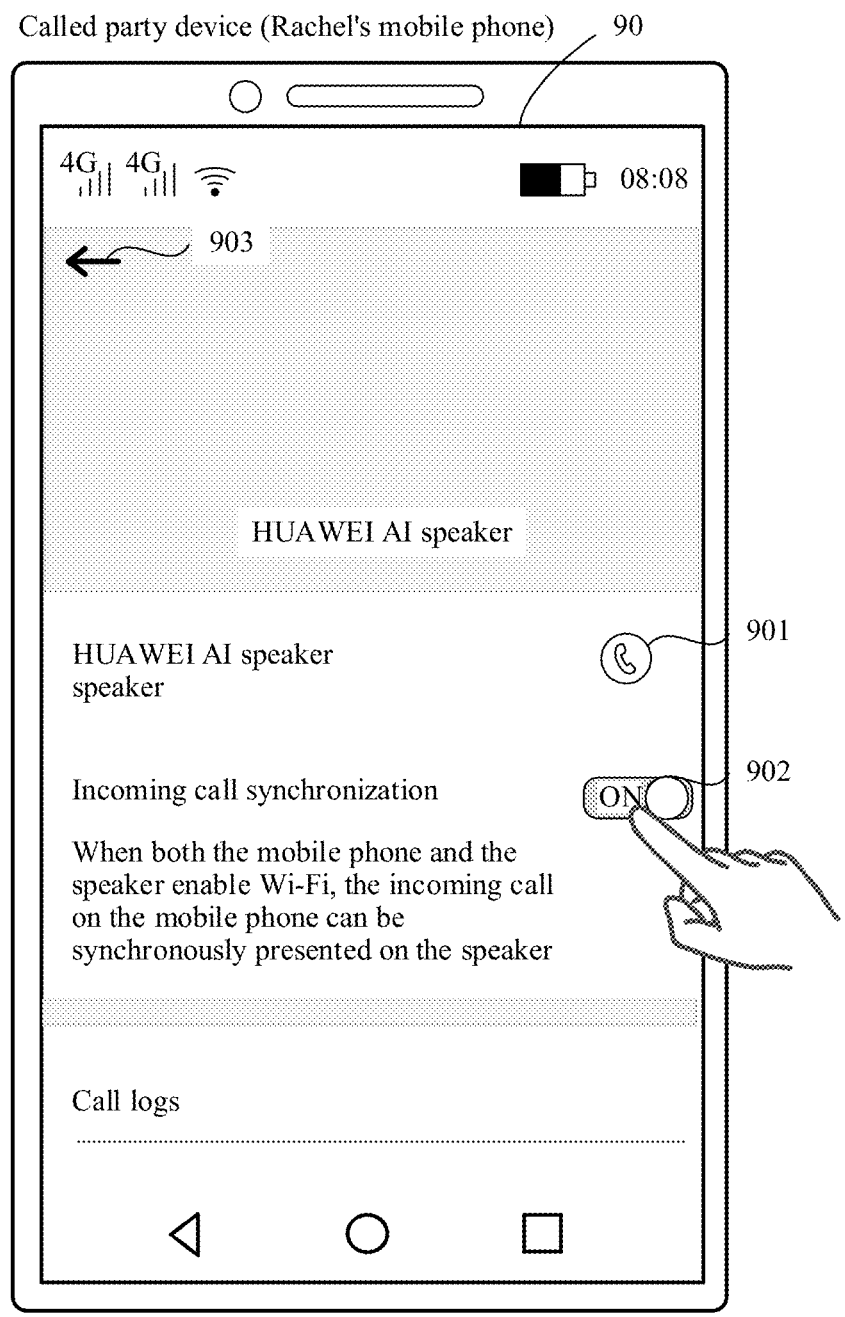

The second electronic device 200 may display a user interface 90 in response to a user operation performed on the "speaker" option 801. As shown in FIG. 4I, the user interface 90 may include a "dial" control 901, an "incoming call synchronization" control 902, call logs, and a "back" control 903.

The "dial" control 901 is used by the second electronic device 200 to initiate calling to the smart speaker 400. The "back" control 903 is used to back to an upper-level interface of the user interface 90.

The "incoming call synchronization" control 902 may include two states: enabled and disabled. The "incoming call synchronization" control 902 may be in the disabled state. In response to a user operation performed on the "incoming call synchronization" control 902, the second electronic device 200 may display the "incoming call synchronization" control 902 in the enabled state. An association relationship between the second electronic device 200 and the smart speaker 400 may be stored on the server 500. When the "incoming call synchronization" control 902 is in the enabled state, if an account (for example, a mobile phone number) corresponding to the second electronic device 200 is called, the second electronic device 200 and the smart speaker 400 each provide a prompt. For example, the second electronic device 200 rings and displays an incoming call screen according to a profile. The smart speaker 400 outputs a voice "XXX is calling. Please choose to answer or hang up . . . ".

In embodiments of this application, the smart speaker 400 may detect, by using a Wi-Fi capability, whether a distance between the smart speaker 400 and the second electronic device 200 is within a preset range; or detect whether the second electronic device 200 and the smart speaker 400 are connected to a same local area network. If the distance between the smart speaker 400 and the second electronic device 200 is within the preset range or the second electronic device 200 and the smart speaker 400 are connected to the same local area network, the smart speaker 400 and the second electronic device 200 each output an incoming call prompt. Therefore, the second electronic device 200 may display, on the user interface 90, a prompt "when both the mobile phone and the speaker enable Wi-Fi, an incoming call on the mobile phone can be synchronously presented on the speaker".

Figure 4J:
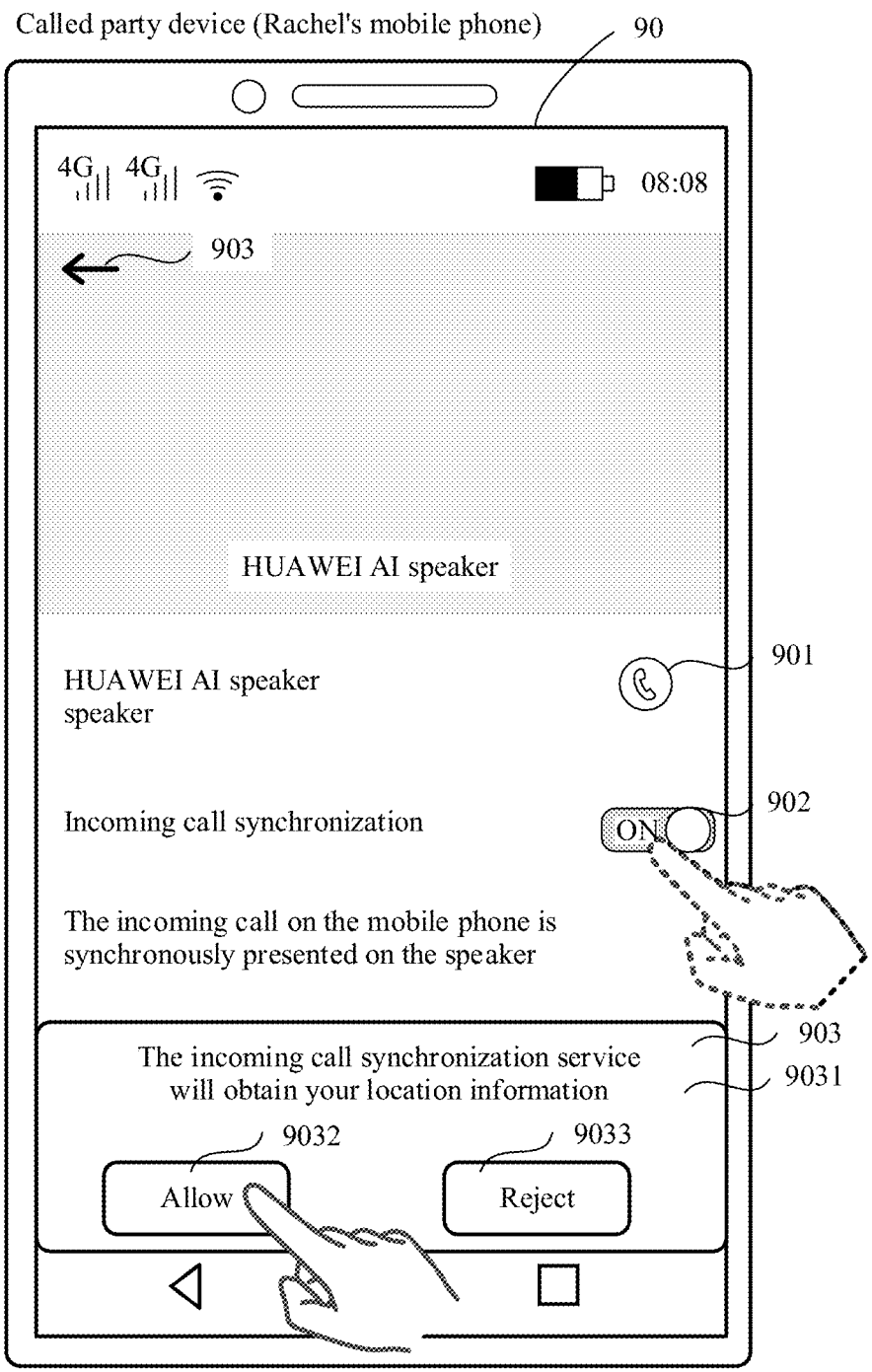

In some other embodiments of this application, if the "incoming call synchronization" control 902 is in an enabled state, when receiving calling initiated by the server 500, the second electronic device 200 and the third electronic device 300 may report positioning information of the second electronic device 200 and the third electronic device 300 to the server 500. In this case, before reporting the positioning information, the second electronic device 200 may display, on the user interface 90, a prompt "an incoming call on the mobile phone is synchronously presented on the speaker". As shown in FIG. 4J, in response to a touch operation performed on the "incoming call synchronization" control 902, the second electronic device 200 may display a prompt box 903, and the prompt box 903 may include a prompt 9031, an "allow" control 9032, and a "reject" control 9033. The prompt 9031 is used to provide a prompt "the incoming call synchronization service will obtain your location information". The "allow" control 9032 may be used by the second electronic device 200 to: in response to a user operation, allow the second electronic device 200 to report positioning information to the server 500 when calling initiated by the server 500 is received. The "reject" control 9033 may be used to prevent the second electronic device 200 from reporting positioning information to the server 500 when calling initiated by the server 500 is received.

The prompt box 903 is a first user interface in embodiments of this application, the prompt 9031 is second prompt information in embodiments of this application, and the second prompt information indicates whether to allow the second electronic device to report the positioning information.

In an embodiment of this application, an association relationship between the smartwatch 300 and the first account may be generated on Huawei Wear on the second electronic device 200 in response to a user operation. Specifically, a login account of the third electronic device (the smartwatch) 300 and a login account of the second electronic device 200 are the same, for example, both are the first account, and the smartwatch 300 is associated with the first account. In this case, the association relationship between the smartwatch 300 and the first account may be stored on the server 500. For a Huawei Wear icon 1012, refer to FIG. 4A. User interfaces in which Huawei Wear on the second electronic device 200 is logged in to by using the first account and the first account is associated with the smartwatch may be similar to those in FIG. 4A to FIG. 4G, that is, user interfaces in which the first account is associated with the smartwatch 300 on the second electronic device 200.

In another embodiment of this application, an association relationship between the smartwatch 300 and the first account may alternatively be obtained by enabling "One Number Dual Terminal". "One Number Dual Terminal" means that, for example, the second electronic device 200 and the smartwatch use a same first account, such as 136********. Specifically, a user may register "One Number Dual Terminal" for a mobile phone number with an operator, for example, register an intelligent device associated with a SIM card, for example, the smartwatch 300. The smartwatch 300 shares a phone number, a call, traffic in a package, and the like with the second electronic device 200. When the phone number is called, the second electronic device 200 and the smartwatch 300 each provide a prompt. A registration process may be implemented in an application specified by an operator (for example, a China Unicom application), or may be implemented offline in a service center. This is not limited in embodiments of this application.

In embodiments of this application, after the first account is associated with the smart speaker 400 and the smartwatch 300, the association relationships may be stored on the server 500. The association relationships may be obtained by a calling party device and a called party device from the server 500. The calling party device, that is, the first electronic device 100, may obtain the association relationships from the server 500, and display a calling entry on a call screen. A user interface is described by using an example in which a calling party device is Lisa's mobile phone.

Figure 5:
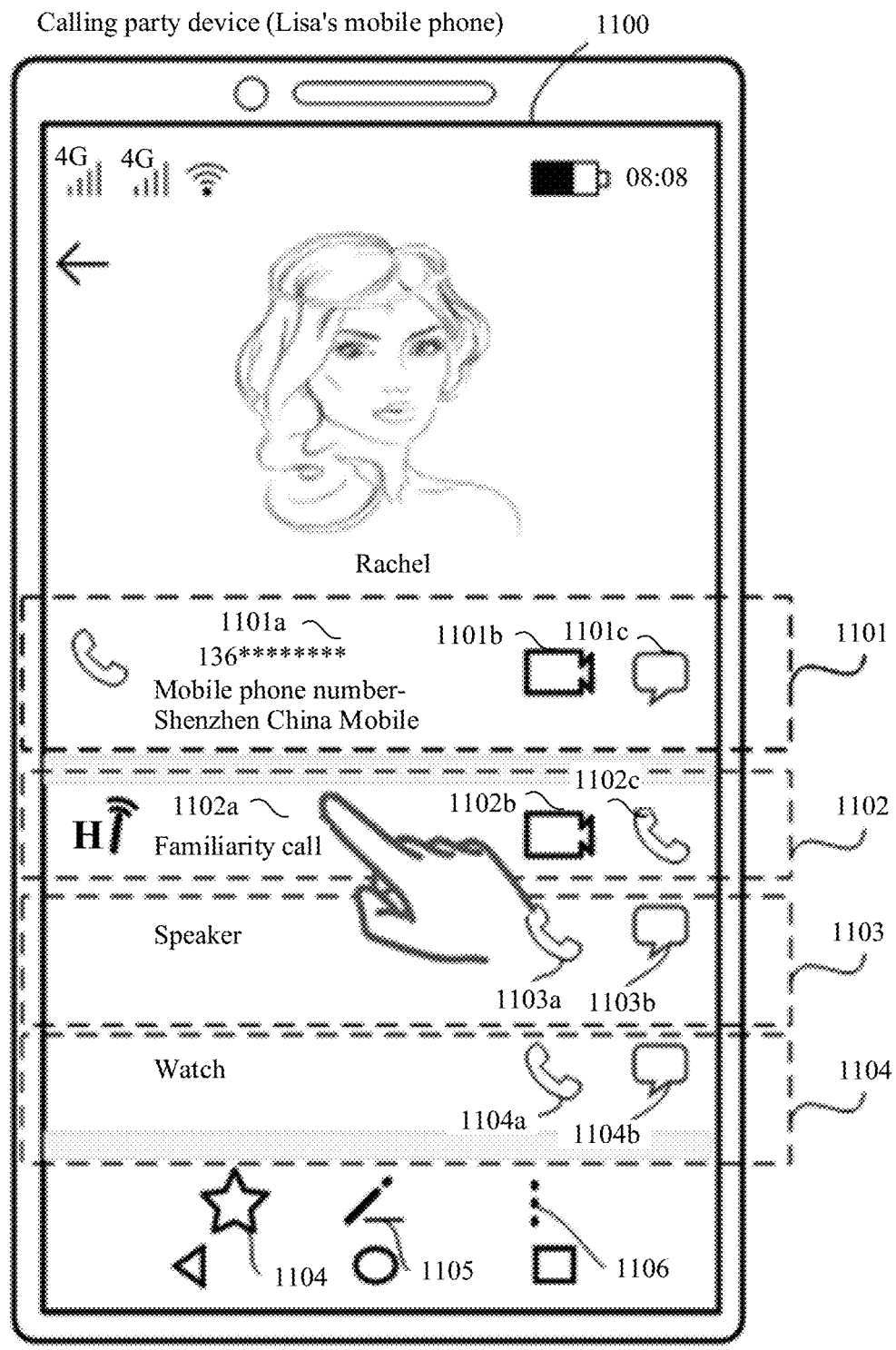
FIG. 5 is a schematic diagram of a user interface according to an embodiment of this application.

FIG. 5 is a schematic diagram of a user interface according to an embodiment of this application. As shown in FIG. 5, the call screen 1100 may include a "number" entry 1101, a "familiarity call" entry 1102, a "speaker" entry 1103, and a "watch" entry 1104. The "number" entry 1101 may include a "number" option 1101a, a "video call" option 1101b, and a "messages" option 1101c. The "number" option 1101a is used to perform voice calling on a device corresponding to the number, for example, a first electronic device 100 corresponding to a number "136******". The "video call" option 1101b is used to perform video calling on the device corresponding to the number, for example, the mobile phone 100 corresponding to the number "136****". The "messages" option 1101c is used to send a message to the device corresponding to the number, for example, the mobile phone 100 corresponding to the number "136******".

The "familiarity call" entry 1102 may include an option 1102a, a "video call" option 1102b, and a "messages" option 1102c, for performing voice calling, video calling, and message sending on a plurality of devices associated with the number "136********". For example, in response to a touch operation performed on the option 1102a, the first electronic device 100 initiates voice calling to the mobile phone 200, the smartwatch 300, and the smart speaker 400. In embodiments of this application, a first user operation includes a touch operation performed on the option 1102a. When the first account is associated with the mobile phone 200 and the smart speaker 400, in response to the first user operation, the first electronic device sends, to the server, a call request used for calling the mobile phone 200 and a call request used for calling the smart speaker 400.

The "speaker" entry 1103 may include a "voice call" option 1103a and a "messages" option 1103b, respectively for performing voice calling and message sending on the smart speaker 400 associated with the number "136********".

The "watch" entry 1104 may include a "voice call" option 1104a and a "messages" option 1103b, respectively for performing voice calling and message sending on the smartwatch 300 associated with the number "136********".

The call screen 1100 may further include a "favorite" control 1104, an "edit" control 1105, and a "more" control 1106, respectively for performing a collect operation, an edit operation, and another operation on the call screen 1100.

When the calling party device initiates calling to a plurality of called party devices, a smart speaker or a smart television in the called party devices may output an incoming call prompt only when a distance between the smart speaker or the smart television and a mobile phone or a smartwatch is less than or equal to a specified threshold. When the distance between the smart speaker and the mobile phone or the smartwatch is greater than the specified threshold, the smart speaker makes no response to the call request. Specifically, the foregoing example in which Lisa's mobile phone calls Rachel's mobile phone, watch, and speaker is used for description. FIG. 6A-1 and FIG. 6A-2 and FIG. 6B-1 and FIG. 6B-2 each are a schematic diagram of a call scenario according to an embodiment of this application.

Figures 1, 6A:
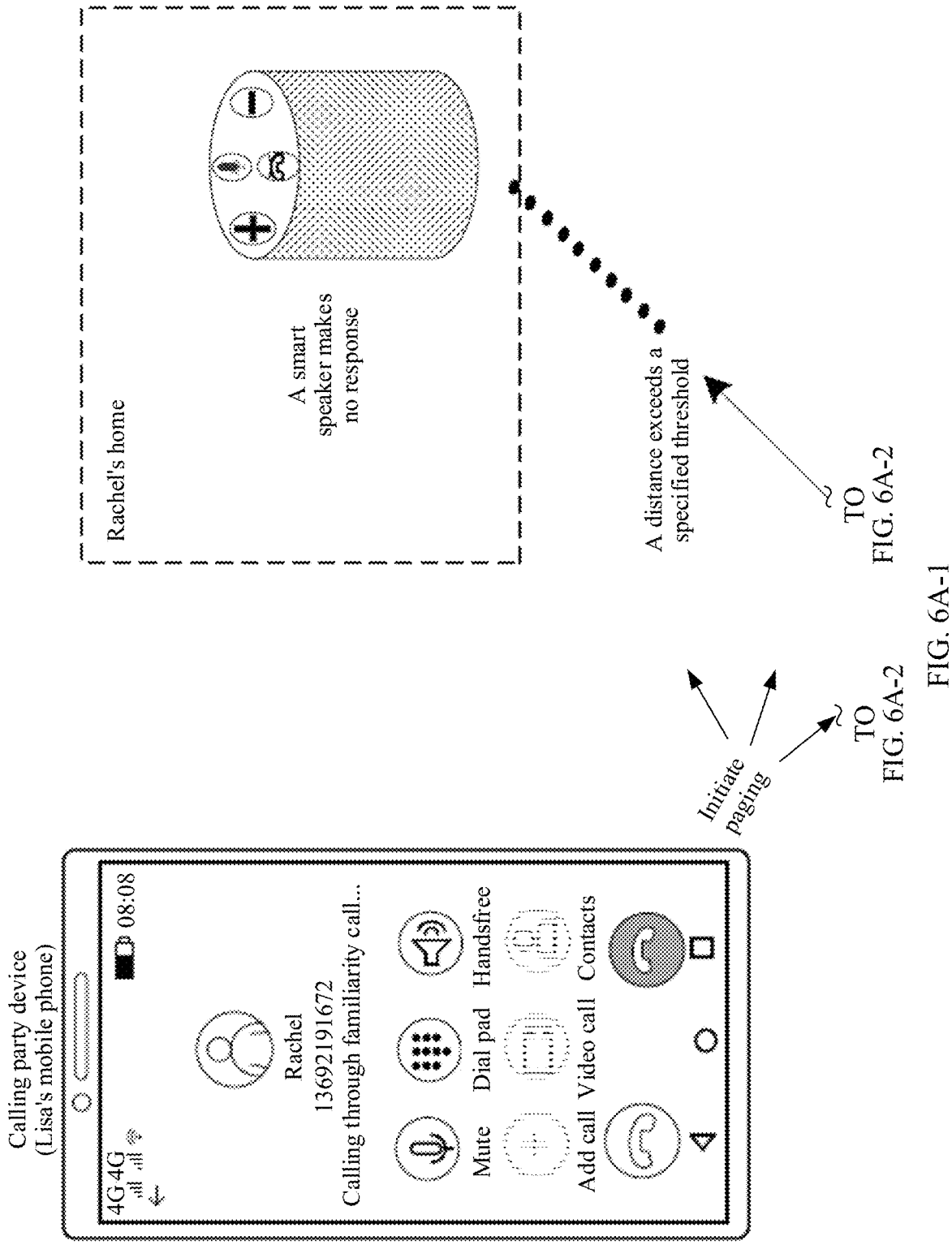

In an example scenario of this embodiment of this application, Rachel is not at home, and neither the mobile phone nor the watch that Rachel carries is at home. For example, Rachel, the mobile phone, and the watch are at the company. When Lisa touches the "familiarity call" option 1102a on the call screen 1100 (as shown in FIG. 5) of Lisa's mobile phone, in response to the user operation, Lisa's mobile phone may initiate calling to Rachel's mobile phone, watch, and speaker by using a server. As shown in FIG. 6A-1 and FIG. 6A-2, Lisa's mobile phone may display a "familiarity call" call screen.

In this embodiment of this application, Lisa's mobile phone may obtain an association relationship between a first account and each of Rachel's mobile phone, watch, and speaker through a query on the server, and display the call screen 1100 based on the association relationship. For details, refer to the descriptions of operation S104 in the call method described in FIG. 9A to FIG. 9C.

When receiving the calling initiated by the server 500, Rachel's mobile phone and watch each may output an incoming call prompt. Specifically, when receiving the calling initiated by the server 500, Rachel's mobile phone may vibrate or ring according to a current profile of the mobile phone, and display an incoming call screen on the mobile phone. For the incoming call screen, refer to an incoming call screen 1000 shown in FIG. 7A. When receiving the calling initiated by the server 500, Rachel's watch may also vibrate or ring according to a current profile of the smartwatch, and display an incoming call screen on the smartwatch. For the incoming call screen, refer to an incoming call screen 1200 shown in FIG. 7B.

Because Rachel is not at home, a distance between Rachel's speaker and each of the carried mobile phone and smartwatch is greater than or equal to a specified threshold. Rachel's speaker makes no response to the received calling initiated by the server 500.

In another example scenario of this embodiment of this application, Rachel is at home. Lisa uses Lisa's mobile phone to initiate calling to Rachel's mobile phone, watch, and speaker through the server.

Figures 1, 6B:
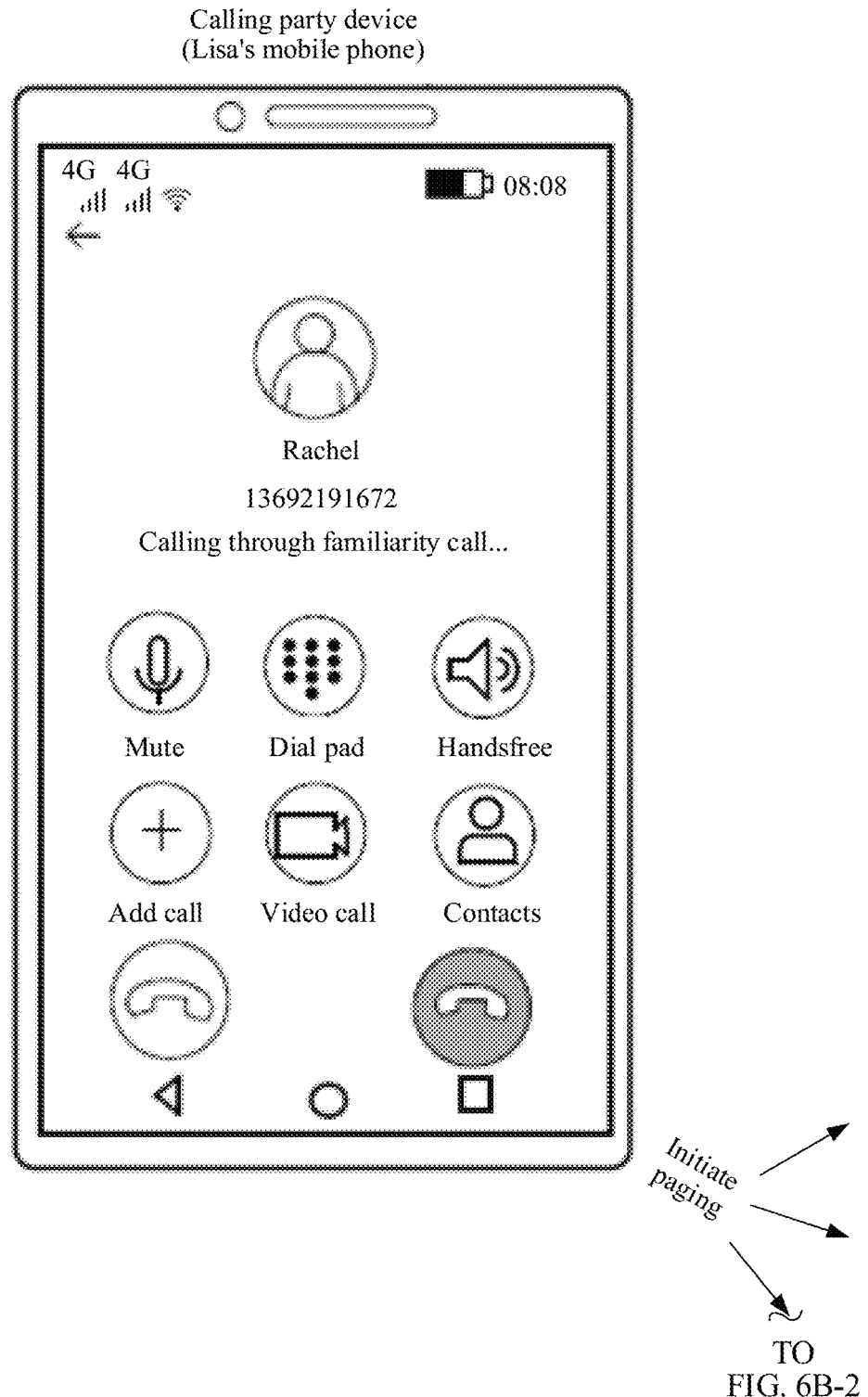
Figures 2, 6B:
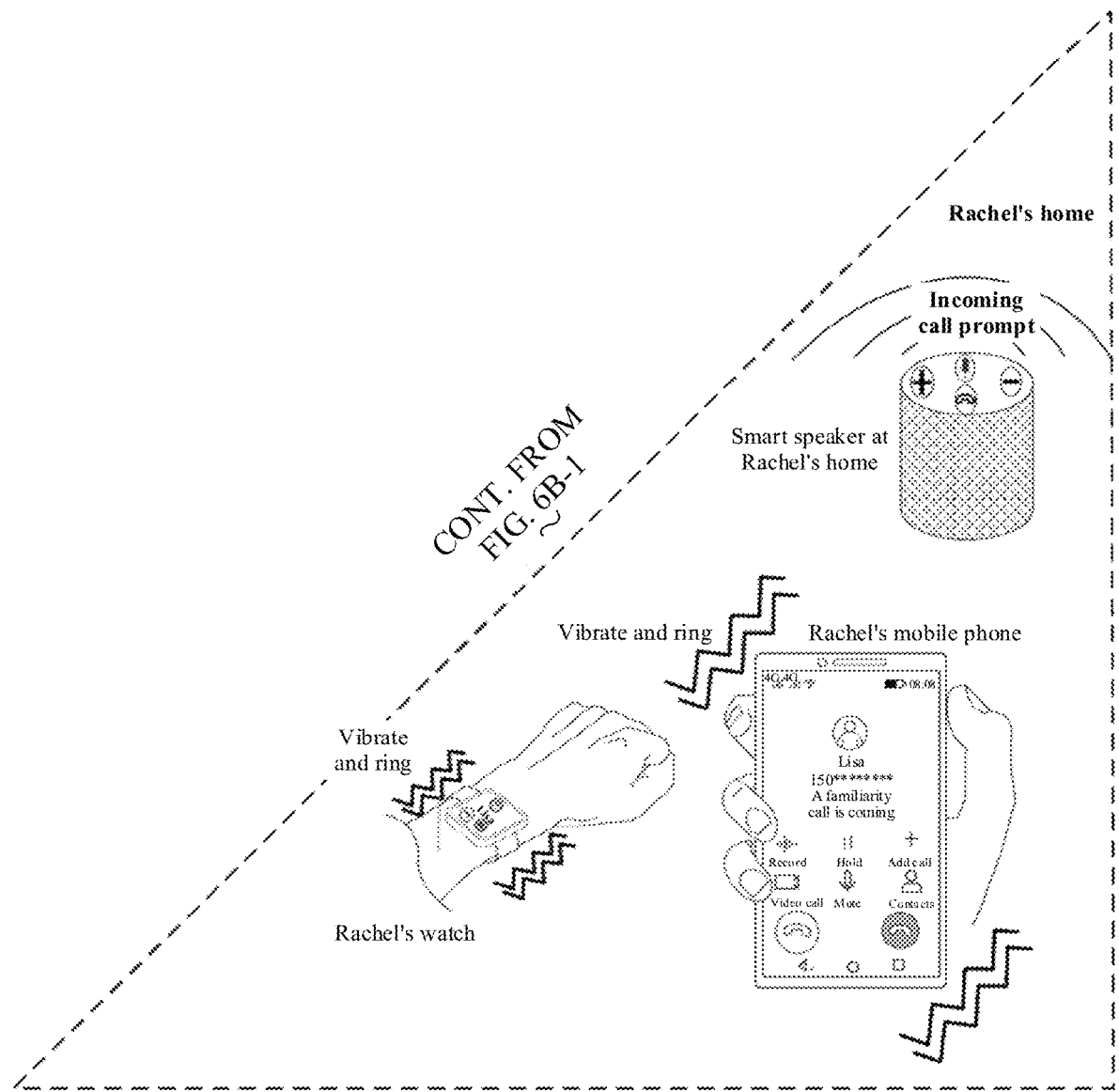

As shown in FIG. 6B-1 and FIG. 6B-2, when receiving the calling, Rachel's mobile phone and watch each may output an incoming call prompt. Because Rachel is at home, a distance between Rachel's speaker and each of the carried mobile phone and smartwatch is less than or equal to the specified threshold. As shown in FIG. 6B-2, Rachel's speaker may output a voice prompt based on the received calling, for example, output a voice "Lisa is calling. Please choose to answer or hang up . . . ".

Based on the scenarios described in FIG. 6A-1 and FIG. 6A-2 and FIG. 6B-1 and FIG. 6B-2, an incoming call prompt is output only when it is detected that a distance between the smart speaker and the smartwatch or the mobile phone is within a range. This can reduce a case in which the incoming call prompt interferes with another person or the incoming call prompt is mistakenly answered by another person when the smart speaker outputs the incoming call prompt but the user is not near the smart speaker. Therefore, convenience of calling a plurality of devices can be improved.

Figure 7A:
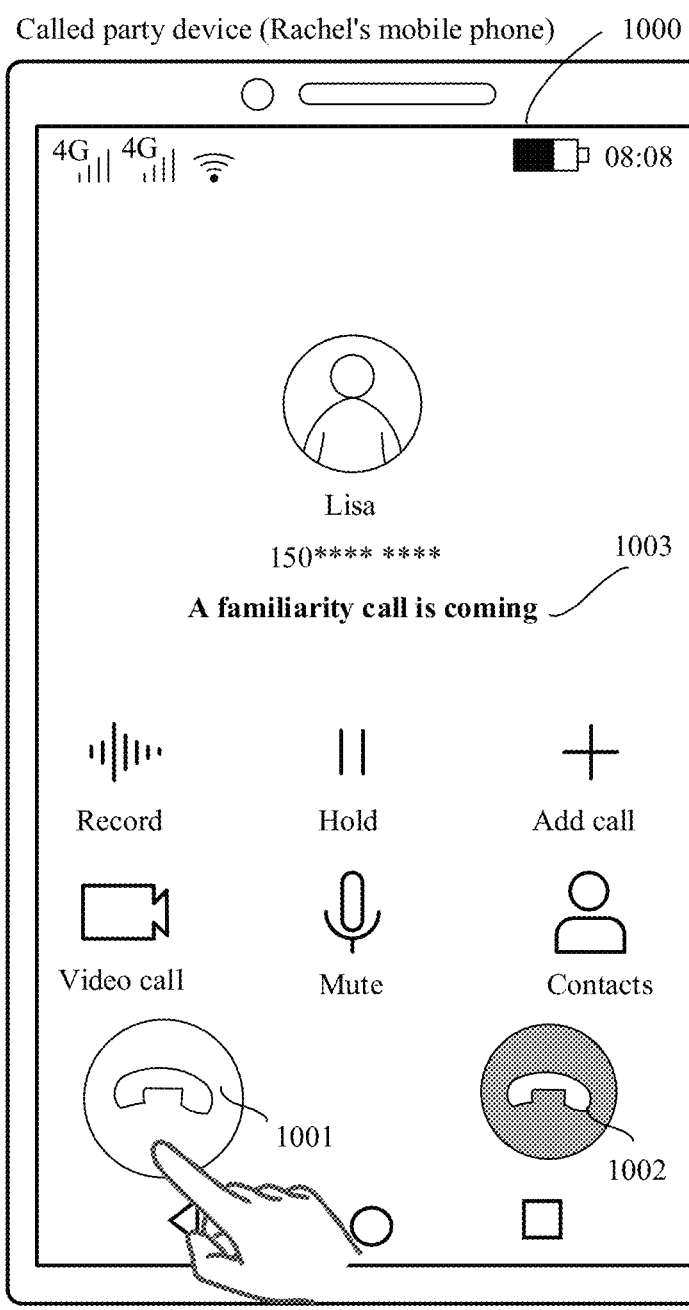
FIG. 7A and FIG. 7B each are a schematic diagram of a user interface according to an embodiment of this application.

When receiving the calling of the first electronic device 100 sent by the server, the second electronic device 200, namely, Rachel's mobile phone, may display the incoming call screen 1000. As shown in FIG. 7A, the incoming call screen 1000 may include an incoming call number, a "record" control, a "hold" control, an "add call" control, a "video call" control, a "mute" control, a "contacts" control, an "accept" control 1001, a "decline" control 1002, and a "familiarity call" prompt 1003.

In response to a user operation performed on the "accept" control 1001, for example, a touch operation, the second electronic device 200 may connect a call channel to a peer end (a terminal corresponding to the incoming call number). The "decline" control 1002 is used to end the current incoming call prompt.

The "familiarity call" prompt 1003 may provide a prompt "a familiarity call is coming".

Figure 7B:
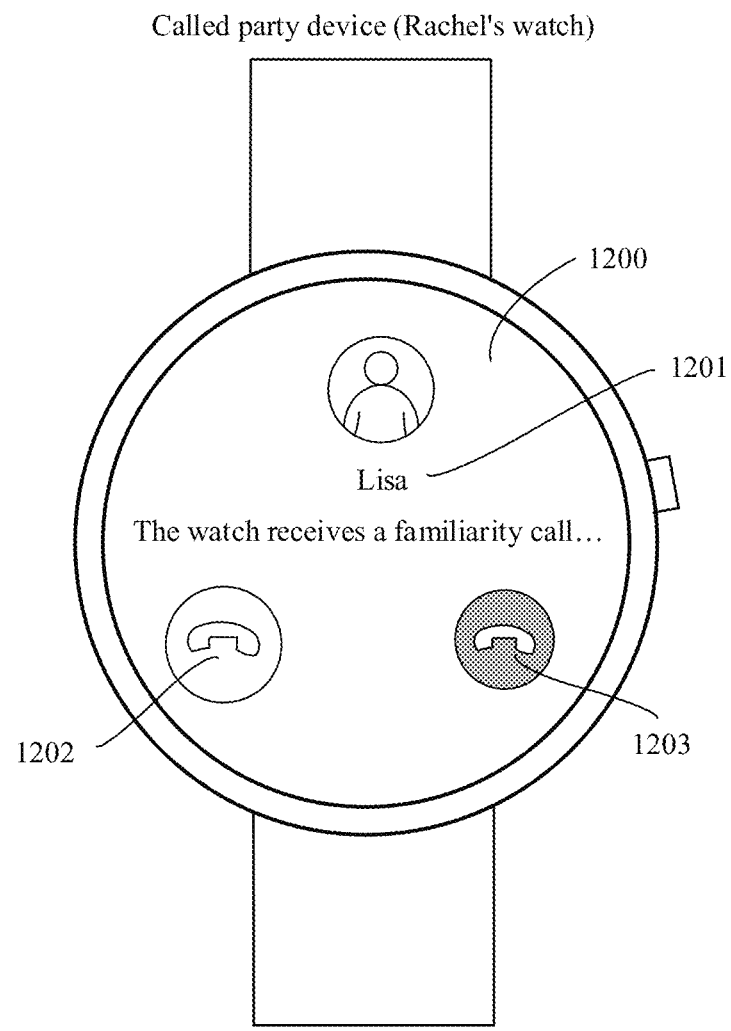

When the smartwatch 300, that is, Rachel's watch, receives the calling of the first electronic device 100 (Lisa's mobile phone) initiated by the server 500, if the distance between Rachel's speaker and each of the carried mobile phone and smartwatch is less than or equal to the specified threshold, the smartwatch 300 may display the incoming call screen 1200. As shown in FIG. 7B, the incoming call screen 1200 of the smartwatch 300 may include an incoming call prompt 1201, an "accept" control 1202, and a "decline" control 1203. The incoming call prompt 1201 may present an incoming call contact "Lisa". The "accept" control 1202 is used to connect a call channel. The "decline" control 1203 is used to hang up the current incoming call.

In embodiments of this application, the smart speaker 400 may detect, by using a Wi-Fi capability, whether a distance between the smart speaker 400 and the second electronic device 200 is within a preset range. In this case, Wi-Fi modules of both the smart speaker 400 and the second electronic device 200 need to be in a working state. For the smart speaker 400, the Wi-Fi module may be always in the working state, or in response to a user operation performed on a button, the Wi-Fi module of the smart speaker 400 is enabled to be in the working state. The user operation on the button is, for example, a pressing operation performed on the button.

For the second electronic device 200 such as a mobile phone, if a Wi-Fi switch is in an enabled state, the Wi-Fi module of the second electronic device 200 is in a working state. Detection on the distance between the second electronic device 200 and the smart speaker 400 is not limited to using a Wi-Fi capability, and may alternatively use another short-range wireless communication capability, for example, a Bluetooth capability. In this case, Bluetooth modules of both the smart speaker 400 and the second electronic device 200 need to be in a working state. For the second electronic device 200, if a Bluetooth switch is in an enabled state, the Bluetooth module of the second electronic device 200 is in a working state.

Figure 8:
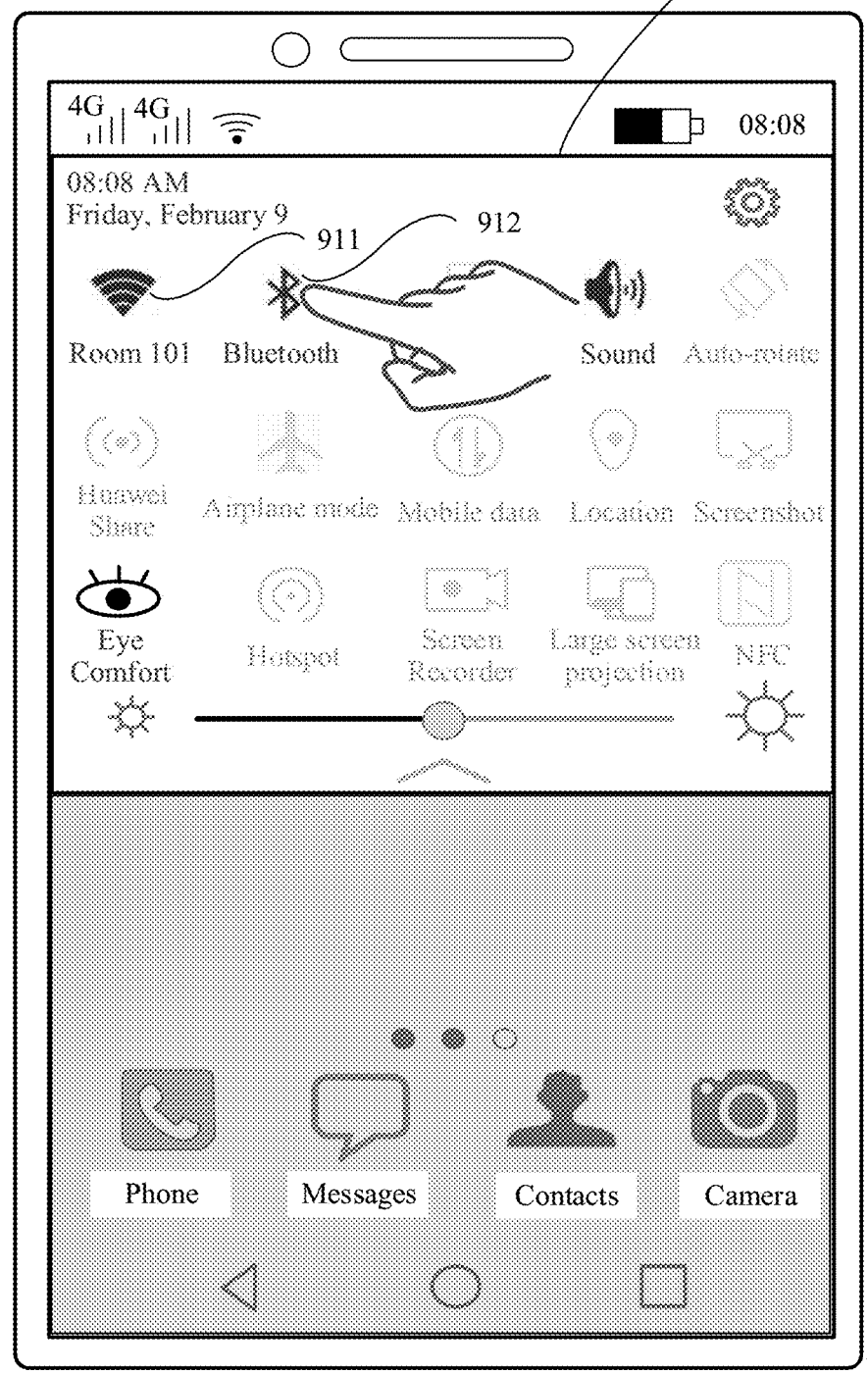
FIG. 8 is a schematic diagram of a user interface according to an embodiment of this application.

Specifically, FIG. 8 is a schematic diagram of a user interface according to an embodiment of this application. As shown in FIG. 8, a Bluetooth switch and a Wi-Fi switch of the second electronic device 200 may be included in a window menu 91. The second electronic device 200 may receive a slide operation (for example, slide down from a position of the status bar 102) performed on the status bar 102 on the home screen 10 described in FIG. 4A. In response to the slide operation performed on the status bar 102, the second electronic device 200 may display the window menu 91 shown in FIG. 8.

As shown in FIG. 8, the window menu 91 may include switch controls of some functions (for example, a Wi-Fi switch 911, a Bluetooth switch 912, a flashlight switch, a notification mode switch control, an auto-rotate switch, a Huawei Share switch, an airplane mode switch, a mobile data switch, a location switch, a screenshot switch, an eye comfort mode switch, a hotspot switch, a screen recording switch, a large screen projection switch, and an NFC switch). In response to a user operation performed on the Wi-Fi switch 911, the second electronic device 200 may switch a status of the Wi-Fi switch between an enabled state and a disabled state for display. After the Wi-Fi switch is enabled, the second electronic device 200 may be connected to a data network through a local area network, for example, through a local area network named "room 101". In this case, the second electronic device 200 may present, on the Wi-Fi switch 911 in the window menu 91, a name of the connected local area network, namely, "room 101", and be connected to a data network through the local area network. Similarly, in response to a user operation performed on the Bluetooth switch 912, the second electronic device 200 may switch a status of the Bluetooth switch 912 between an enabled state and a disabled state for display.

In embodiments of this application, the Wi-Fi switch and the Bluetooth switch are not limited to being included in the window menu 91 shown in FIG. 8, and may alternatively be included in another user interface, for example, a setting interface. This is not limited in embodiments of this application.

Figure 9A:
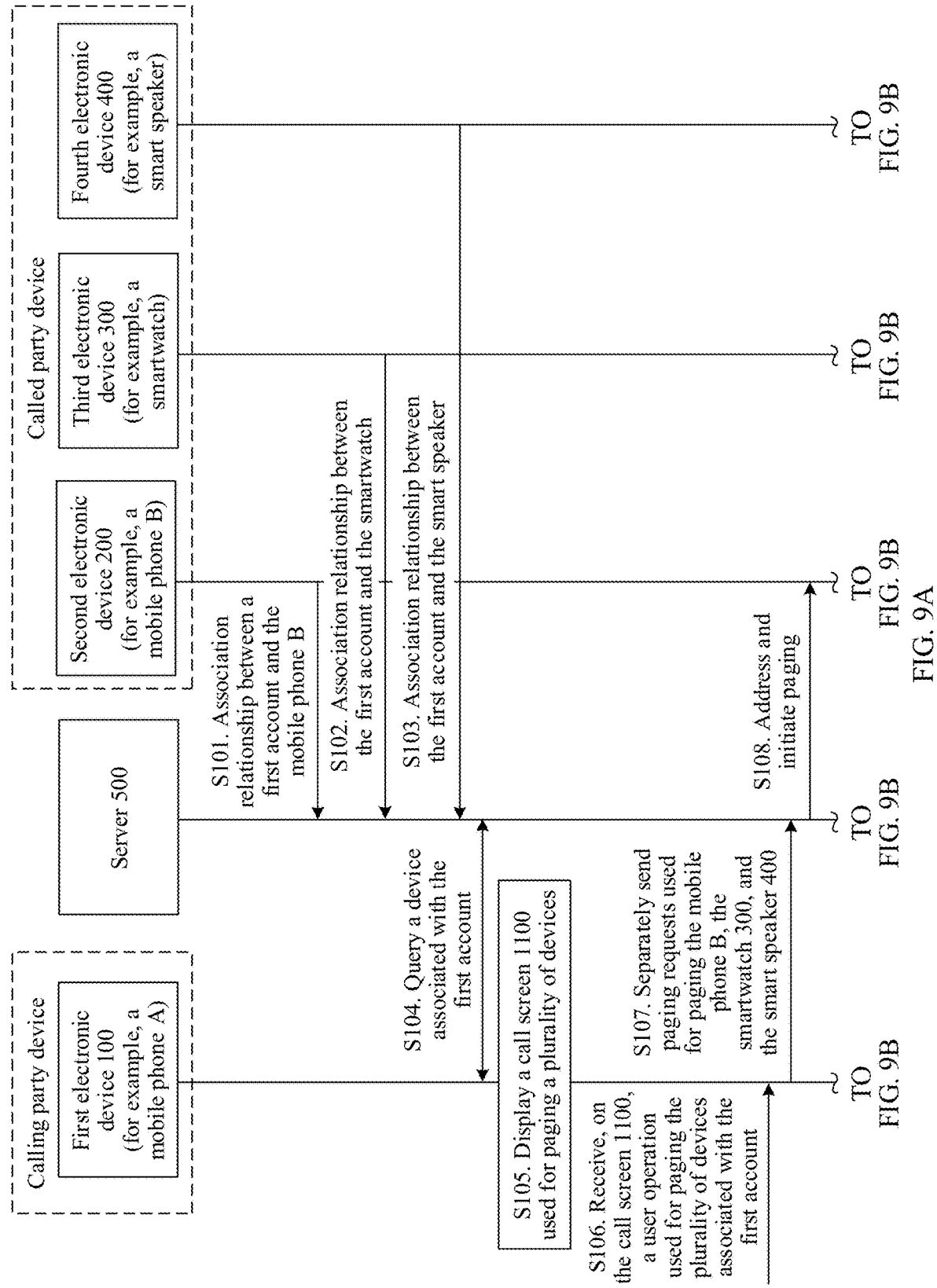
FIG. 9A to FIG. 9C are a schematic flowchart of a call method according to an embodiment of this application.
Figure 9B:
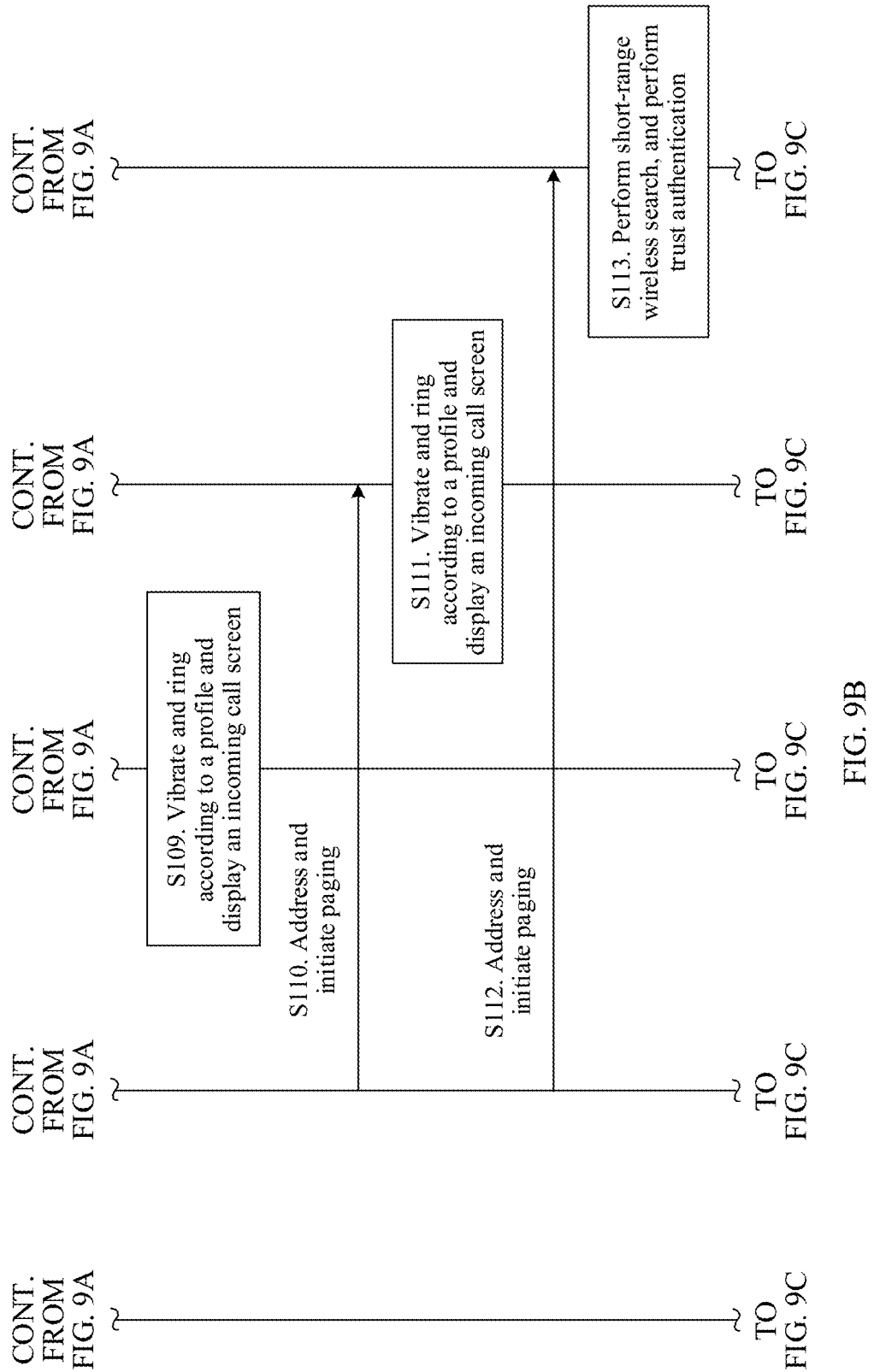
Figure 9C:
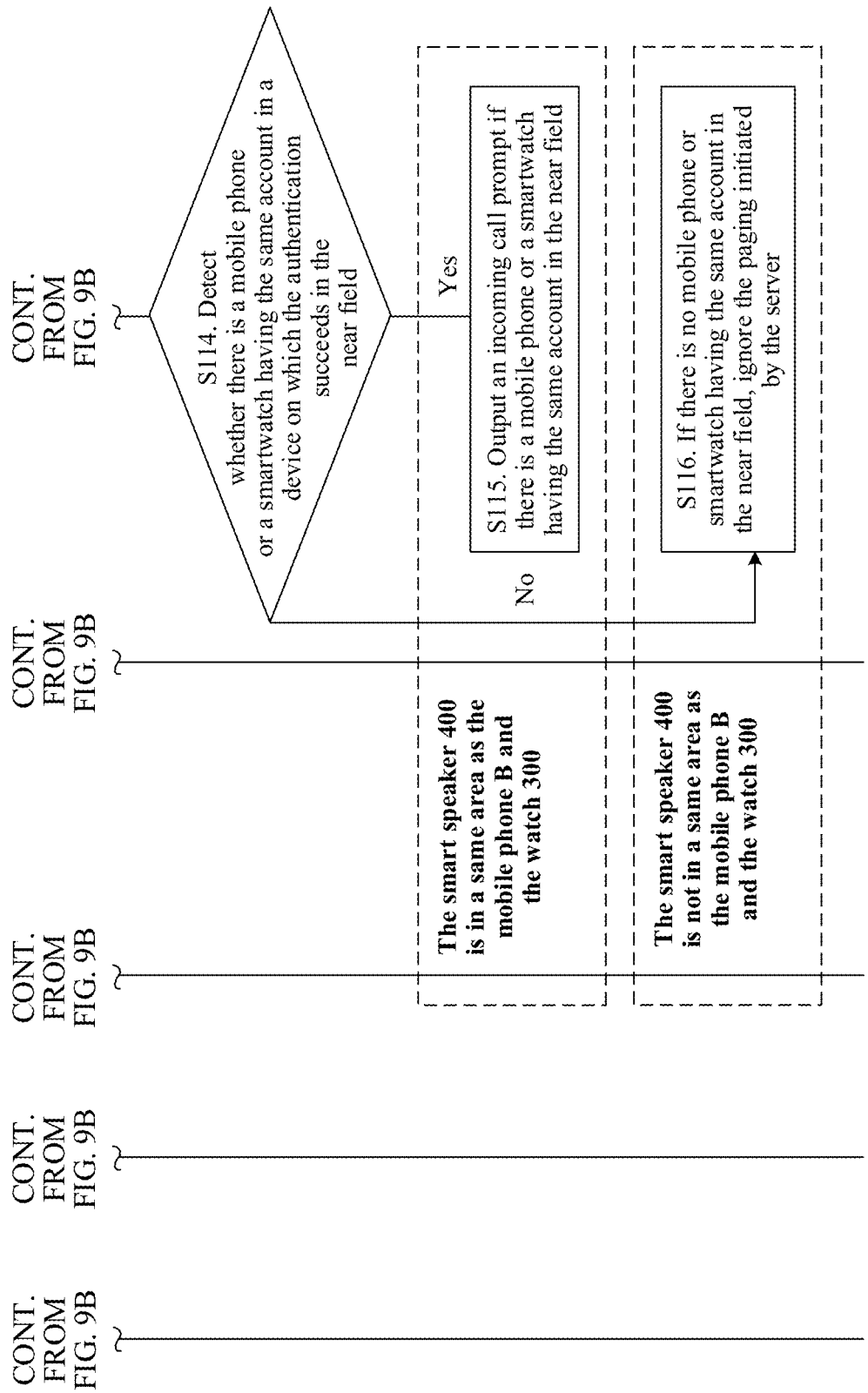

The following describes a call method provided in an embodiment of this application. In the call method, a first electronic device 100 may call, by using a first account, a plurality of called party devices: a second electronic device 200, a smartwatch 300, and a smart speaker 400. When receiving a call request, the smart speaker may detect, by using a short-range wireless capability, whether a distance between the smart speaker and each of the smartwatch 300 and the second electronic device 200 is less than a distance threshold, namely, a specified threshold. If the distance between the smart speaker and each of the smartwatch 300 and the second electronic device 200 is less than the specified threshold, the smart speaker 400 may output an incoming call prompt. FIG. 9A to FIG. 9C are a schematic flowchart of a call method according to an embodiment of this application. As shown in FIG. 9A to FIG. 9C, for example, the first electronic device 100 is a mobile phone A, and the second electronic device 200 is a mobile phone B. The call method may include operations S101 to S116.

S101. A server 500 receives an association relationship between a first account and the mobile phone B.

In some embodiments of this application, when the first account "136******" is registered with the mobile phone B, and the mobile phone B associates the first account with the smart speaker 400** in AI Speaker, the mobile phone B may be associated with the first account.

In some embodiments of this application, the association relationship between the mobile phone B and the first account may be sent to the server 500 together with an association relationship between the smartwatch 300 and the first account. In other words, the first account is associated with the mobile phone B and the smartwatch 300, and the mobile phone B sends the association relationships to the server 500. An occasion on which the mobile phone B sends the association relationships to the server 500 is not limited in embodiments of this application.

S102. The server 500 receives the association relationship between the first account and the smartwatch 300.

In embodiments of this application, the association relationship between the first account and the smartwatch 300 may be generated in response to a user operation on an application (for example, Huawei Wear) corresponding to the smartwatch 300 on the mobile phone B, and then sent to the server 500. User interfaces in which Huawei Wear on the mobile phone B is logged in to by using the first account and the first account is associated with the smartwatch 300 may be similar to those in FIG. 4A to FIG. 4G. The association relationship may be sent by the mobile phone B to the server 500, or may be sent by the smartwatch 300 to the server 500. This is not limited in embodiments of this application.

S103. The server 500 receives an association relationship between the first account and the smart speaker 400.

In embodiments of this application, the association relationship between the first account and the smart speaker 400 may be generated in response to a user operation on an application (for example, AI Speaker) corresponding to the smart speaker 400 on the mobile phone B, and then sent to the server 500. For user interfaces in which AI Speaker on the mobile phone B is logged in to by using the first account and the first account is associated with the smartwatch 300, refer to FIG. 4A to FIG. 4G. The association relationship may be sent by the mobile phone B to the server 500, or may be sent by the smart speaker 400 to the server 500. This is not limited in embodiments of this application.

S104. The mobile phone A queries a device associated with the first account.

In embodiments of this application, an occasion on which the mobile phone A queries the device associated with the first account is not limited. For example, the mobile phone A may query the device associated with the first account on the server when a phone number (namely, the first account) of the mobile phone B is stored in the mobile phone A, or may query the device on any occasion before calling the device by using the interface shown in FIG. 5. The mobile phone A may display, on a call screen 1100 based on the device associated with the first account, an entry used for calling a plurality of devices. For details, refer to the call screen 1100 shown in FIG. 5. The option 1102a, the "video call" option 1102b, and the "messages" option 1102c may be used to initiate voice calling, video calling, and a message sending request to the plurality of associated devices.

S105. The mobile phone A displays the call screen 1100 used for calling a plurality of devices.

S106. The mobile phone A receives, on the call screen 1100, a user operation used for calling the plurality of devices associated with the first account.

In embodiments of this application, the user operation used for calling the devices associated with the first account may include a touch operation performed on the option 1102a, the "video call" option 1102b, or the "messages" option 1102c on the call screen 1100.

In embodiments of this application, the mobile phone A may determine a to-be-called device based on the associated device found through query in operation S104. In another embodiment, the mobile phone A may alternatively re-query, on the server 500, a device associated with the first account, and determine the device as a to-be-called device.

S107. The mobile phone A separately sends, to the server 500, call requests used for calling the mobile phone B, the smartwatch 300, and the smart speaker 400.

A sequence of sending the call requests to the three devices is not limited in embodiments of this application. In embodiments of this application, the call requests may be separately sent to all called devices, and the call request carries a device identifier of the called device. In some embodiments, the mobile phone A may alternatively use one call request to carry device identifiers of a plurality of devices that need to be called, and send the call request to the server 500. In some other embodiments, the mobile phone A may alternatively use a call request to carry the first account, and send the call request to the server 500. The server 500 finds, based on the first account and a stored correspondence between an account and a device identifier, a device identifier corresponding to the first account.

The device identifier may be a MAC address of the device, or may be an identifier generated based on the MAC address, or may be another identifier that uniquely identifies the called party device. A type of the device identifier is not limited in embodiments of this application. The server 500 may address the called party device based on the device identifier, and initiate calling.

Alternatively, in some embodiments of this application, the server 500 may store a communication ID of the called party device, where the communication ID may be used by the server 500 to establish a call channel to the called party device. Specifically, the server 500 may address the called party device based on the communication ID of the called party device, and initiate calling.

The following describes a call process in embodiments of this application. In embodiments of this application, for the calling party device, the first electronic device 100 can send a call request to the server 500 through a network only when the first electronic device 100 enables a data network (for example, enables an operator data switch) or is connected to the data network through a local area network. For the called party device, only when the called party device enables a data network (for example, enables an operator data switch) or is connected to the data network through a local area network, the called party device can be addressed by the server 500 and receive calling initiated by the server 500. The operator data switch is, for example, the mobile data switch in the window menu 91 described in FIG. 8. When the second electronic device 200 is connected to a data network through a local area network, the second electronic device 200 may present, on the Wi-Fi switch 911 in the window menu 91, a name of the connected local area network, namely, "room 101".

In embodiments of this application, a local area network connected to the first electronic device 100 may be the same as or different from a local area network connected to the second electronic device 200. This is not limited in embodiments of this application.

In embodiments of this application, a protocol used by the first electronic device 100 to initiate calling to the second electronic device 200 may be the session initiation protocol (SIP), or may be another customized protocol. This is not limited in embodiments of this application. A process of initiating calling and establishing a call channel may be as follows: In an example in which the called party device is the second electronic device 200, the first electronic device 100 sends, to the server 500, a call request that carries a device identifier of the called party device, and the server 500 may address the second electronic device 200 based on the device identifier, and initiate calling. The second electronic device 200 outputs an incoming call prompt after receiving the calling, and the second electronic device 200 receives a user operation used to answer the incoming call. The second electronic device 200 sends a call response to the server 500, and the server 500 establishes a call channel between the first electronic device 100 and the second electronic device 200.

S108. The server 500 addresses the mobile phone B and initiates calling.

S109. The mobile phone B vibrates and rings according to a profile and displays an incoming call screen.

In embodiments of this application, when the profile of the mobile phone B is the vibration on ring mode, the mobile phone B may vibrate, ring, and display the incoming call screen 1000 based on the received calling initiated by the server 500. For details, refer to FIG. 7A. When the profile of the mobile phone B is the vibration mode, the mobile phone B may vibrate and display the incoming call screen 1000 based on the calling initiated by the server 500. When the profile of the mobile phone B is the silent mode, the mobile phone B may display the incoming call screen 1000 based on the received calling initiated by the server 500.

In embodiments of this application, when the profile of the mobile phone B is the airplane mode, the mobile phone B makes no response.

S110. The server 500 addresses the smartwatch 300 and initiates calling.

S111. The smartwatch 300 vibrates and rings according to a profile, and displays an incoming call screen.

For the incoming call screen of the smartwatch 300, refer to the incoming call screen 1200 shown in FIG. 7B.

S112. The server 500 addresses the smart speaker 400 and initiates calling.

S113. The smart speaker 400 performs short-range wireless search, and performs trust authentication on a found near-field device.

In embodiments of this application, the smart speaker 400 may search for a near-field device through Wi-Fi, or may search for a near-field device through other short-range wireless communication, for example, through Bluetooth. A used short-range communication manner is not limited in embodiments of this application. In embodiments of this application, Wi-Fi search is used as an example for description.

Specifically, the smartwatch 300, the mobile phone B, and the smart speaker 400 may be connected to a same local area network or different local area networks, and then connected to a data network through the local area network. The smart speaker 400 may detect a received signal strength indication (RSSI) of a signal sent by a surrounding device, and obtain a media access control (MAC) address of the surrounding device. In a short-range wireless search manner, the smart speaker 400 searches, through Wi-Fi, for a broadcast sent by a surrounding device, and detects an RSSI in the broadcast sent by the surrounding device and the MAC address carried in the broadcast. The smart speaker 400 may determine, based on the MAC address and the RSSI of the surrounding device, a device within a distance range, that is, a near-field device found by the smart speaker 400. The distance range is, for example, a range of 10 meters from the smart speaker 400.

In another embodiment, a device connected to the same local area network as the smart speaker 400 may be used as a device found by the smart speaker 400. In other words, in a short-range wireless search manner, a home device searches, through Wi-Fi, for a broadcast sent by a surrounding device, and detects a device that has a same SSID as the Wi-Fi connected to the home device. To be, that the home device obtains, through short-range wireless search, information about a device whose distance from the home device is within a specified threshold includes: The home device obtains information about a device that is located in a same Wi-Fi network as the home device, and determines the device that is located in the same Wi-Fi network as the home device as the device whose distance from the home device is within the specified threshold.

For example, Wi-Fi modules of the smartwatch 300, the mobile phone B, and the smart speaker 400 are all enabled. The smartwatch 300 and the mobile phone B may broadcast Wi-Fi signals, and the Wi-Fi signals carry MAC addresses of the smartwatch 300 and the mobile phone B. The smart speaker 400 may scan a Wi-Fi broadcast signal, and use, as a found device, a device corresponding to a Wi-Fi broadcast signal whose RSSI is greater than a specified threshold.

In embodiments of this application, the smart speaker 400 may perform trust authentication on the found device. Specifically, the trust authentication may be performed by using an asymmetric encryption technology. For example, a trusted device stores a public key of the smart speaker 400. The smart speaker 400 may store a private key corresponding to the public key. The smart speaker 400 may send a signature of the private key to the found device based on a MAC address. The trusted device may verify the signature of the private key by using the stored public key of the smart speaker 400, and return an authentication result to the smart speaker 400, to indicate that the authentication succeeds. Another device that does not store the public key of the smart speaker 400 returns an incorrect authentication result, to indicate that the authentication fails. The smart speaker 400 may select, from the found device based on the authentication result, a device on which authentication succeeds.

In embodiments of this application, the smart speaker 400 detects, for only the device on which authentication succeeds, whether the device includes a device of a same account. Therefore, security of calling a plurality of devices is improved.

In embodiments of this application, when the smart speaker 400, the mobile phone B, and the smartwatch 300 are in a same area, for example, in the scenario described in FIG. 6B-1 and FIG. 6B-2, after the mobile phone B and the smartwatch 300 are found by the smart speaker 400, the smart speaker 400 may perform trust authentication on the mobile phone B and the smartwatch 300. The smartwatch 300 returns an authentication result to the smart speaker 400. The mobile phone B returns an authentication result to the smart speaker 400.

S114. The smart speaker 400 detects whether there is a mobile phone or a smartwatch having the same account in a near-field device on which the authentication succeeds.

In embodiments of this application, the smart speaker 400 may detect whether there is a mobile phone or a smartwatch having the same account as the smart speaker 400 in the device on which the authentication succeeds. For example, the smart speaker 400 may obtain a device identifier from the device on which the authentication succeeds. The smart speaker 400 may alternatively obtain, from the server 500 based on a device identifier of the smart speaker 400, a device identifier of the mobile phone B having the same account as the smart speaker 400 and a device identifier of the smartwatch 300 having the same account as the smart speaker 400. A device identifier of a device having the same account may be obtained based on an association relationship between the account and the device identifier. The smart speaker 400 may detect whether the identifier of the device on which the authentication succeeds include the device identifier of the mobile phone B having the same account or the device identifier of the smartwatch 300 having the same account. If the identifier of the device on which the authentication succeeds includes the device identifier of the mobile phone B or the device identifier of the smartwatch 300, it indicates that the device on which the authentication succeeds includes the mobile phone or the smartwatch having the same account as the smart speaker 400.

In some other embodiments of this application, the mobile phone B and the smartwatch 300 may obtain, from the server 500, the device identifier of the smart speaker 400 having the same account. The mobile phone B and the smartwatch 300 may send the device identifiers of the mobile phone B and the smartwatch 300 to the smart speaker 300 based on the identifier of the device having the same account. The smart speaker 300 may detect whether the identifier of the device on which the authentication succeeds includes the device identifier of the mobile phone B having the same account or the device identifier of the smartwatch 300 having the same account. If the identifier of the device on which the authentication succeeds includes the device identifier of the mobile phone B or the device identifier of the smartwatch 300, it indicates that the device on which the authentication succeeds includes the mobile phone or the smartwatch having the same account as the smart speaker 400.

In embodiments of this application, the smart speaker 400 may distinguish a personal device (for example, the mobile phone B or the smartwatch 300) from a smart speaker or a smart television that is difficult to carry. For example, the smart speaker distinguishes, based on device identifiers, a personal device from a device that is difficult to carry. The smart speaker 400 performs operation S115 only when it is detected that the identifier of the device on which the authentication succeeds includes an identifier of a personal device having the same account. However, when it is detected that the identifier of the device on which the authentication succeeds includes an identifier of a speaker or a smart television having the same account, but does not include an identifier of a personal device having the same account, the smart speaker 400 makes no response. In other words, in embodiments of this application, the device is a personal device such as the mobile phone B or the smartwatch 300.

S115. If there is a mobile phone or a smartwatch having the same account in the near field, the smart speaker 400 outputs an incoming call prompt.

In embodiments of this application, the incoming call prompt that is output by the smart speaker 400 may be a voice prompt, for example, an output voice "Lisa is calling. Please choose to answer or hang up . . . ". For descriptions of operation S115, refer to the scenario described in FIG. 6B-1 and FIG. 6B-2.

In embodiments of this application, the incoming call prompt is not limited to being applied to a voice call scenario and a video call scenario, and may alternatively be applied to a voice message scenario. For example, the mobile phone A sends text information such as an SMS message to the mobile phone B, the smartwatch 300, and the smart speaker 400. That the smart speaker 400 outputs an incoming call prompt may be converting the text information into a voice and playing the voice.

S116. If there is no mobile phone or smartwatch having the same account in the near field, the smart speaker 400 ignores the calling initiated by the server 500.

The smart speaker 400 ignores the calling initiated by the server 500, that is, the smart speaker 400 makes no response to the calling. For descriptions of operation S116, refer to the scenario described in FIG. 6A-1 and FIG. 6A-2.

In some embodiments of this application, in operation S112, the calling initiated by the server 500 to the smart speaker 400 may carry a simultaneous-ringing identifier. The simultaneous-ringing identifier indicates that a plurality of devices are called, and the plurality of devices include the smart speaker 400. The smart speaker 400 performs operation 5113 only when detecting that the calling initiated by the server 500 carries the simultaneous-ringing identifier.

In the call method described in FIG. 9A to FIG. 9C, when receiving the calling, the smart speaker 400 may detect, by using a Wi-Fi capability, whether there is a device associated with the same account as the smart speaker 400 in the near field. Only if there is a device associated with the same account, the smart speaker 400 outputs an incoming call prompt. Because personal devices such as the smartwatch and the mobile phone B are usually carried by a user, an incoming call prompt is output only when it is detected, through Wi-Fi, that a distance between the smart speaker 400 and the smartwatch or the mobile phone is within a range. This can reduce a case in which the incoming call prompt interferes with another person or the incoming call prompt is mistakenly answered by another person when the smart speaker 400 outputs the incoming call prompt but the user is not near the smart speaker 400. In this way, convenience of calling a plurality of devices can be improved.

In some other embodiments of this application, it is not limited to operations 5113 to 5115 in which the smart speaker 400 searches for a near-field device. Alternatively, a personal device may perform short-range wireless search, for example, the mobile phone B or the smartwatch 300 searches for a near-field device. Specifically, in an example in which the mobile phone B searches for a near-field device, the calling initiated by the server 500 to the mobile phone B may also carry a simultaneous-ringing identifier. When receiving the calling initiated by the server 500, the mobile phone B may search for a near-field device, for example, search for the near-field device through Wi-Fi. For a search process, refer to operation S113. The mobile phone B may perform trust authentication on a found near-field device, and detect whether there is the smart speaker 400 having the same account in the device on which authentication succeeds. If there is the smart speaker 400, the mobile phone B may notify the smart speaker 400, and the smart speaker 400 may output an incoming call prompt based on the notification.

It may be understood that, in embodiments of this application, an example in which personal devices are the mobile phone B and the smartwatch 300 is used for description. However, this is not limited in embodiments of this application. The personal device may alternatively include another device, for example, a smart band. In operation S105, the smart speaker 400 may alternatively detect whether only the mobile phone B is included in the device on which the authentication succeeds, or detect whether only the smartwatch 300 is included in the device on which the authentication succeeds.

In some embodiments of this application, the server stores an association relationship between the first account and each of an identifier of the home device, an identifier of the second electronic device, and the identifier of the smartwatch. The association relationships are, for example, association relationships between the account "136********" and the device identifiers shown in the table in the example shown in FIG. 1. After a first application and a second application on the second electronic device are uninstalled, the association relationships may still be stored on the server. When AI Speaker and Huawei Wear installed on an electronic device (for example, a third electronic device) other than the second electronic device are logged in to by using the first account, the third electronic device, the smartwatch, and the smart speaker may still be called by the first electronic device by using the first account.

In some other embodiments of this application, after the first application and the second application on the second electronic device are uninstalled, the second electronic device may alternatively notify the server to delete the association relationships.

Figure 10A:
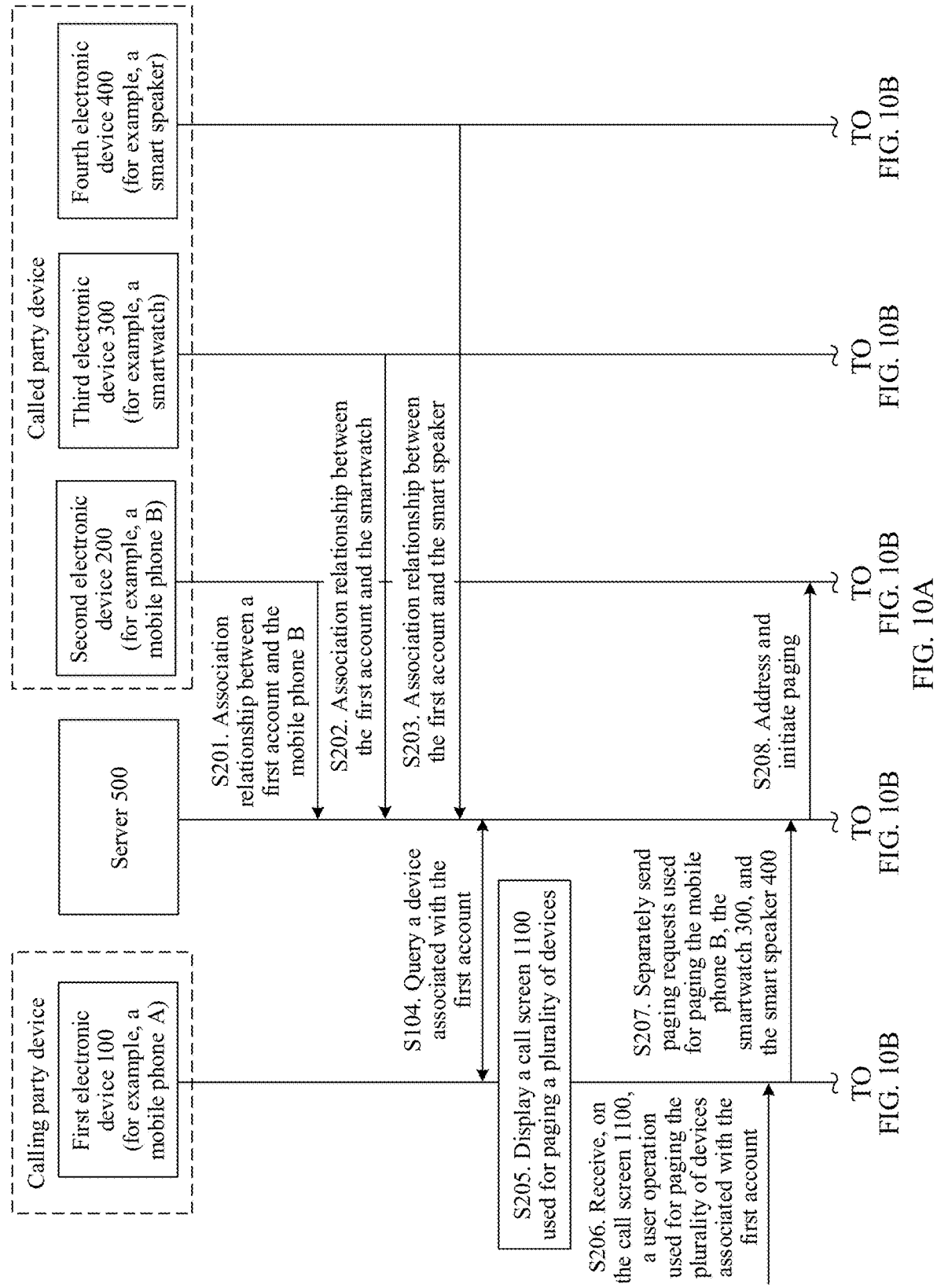
Figure 10B:
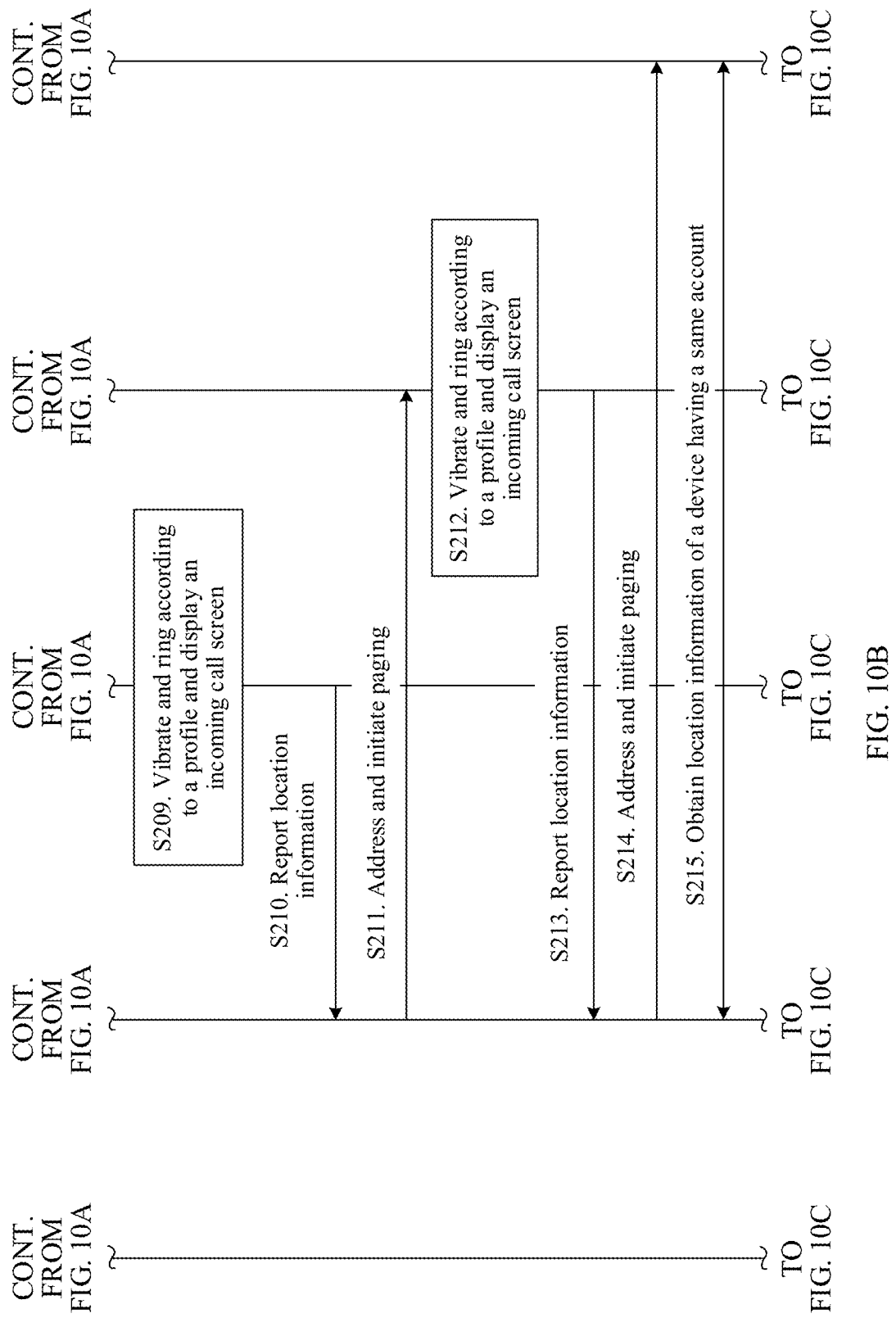

The following describes another call method provided in an embodiment of this application. In the call method, a first electronic device 100 may call, by using a first account, a plurality of called party devices: a mobile phone B, a smartwatch 300, and a smart speaker 400. When receiving the calling, the mobile phone B and the smartwatch 300 may report positioning information to the server 500. When receiving the calling initiated by the server 500, the smart speaker 400 may obtain, from the server 500, the positioning information of the mobile phone B having the same account and the positioning information of the smartwatch 300 having the same account. The smart speaker 400 may detect, based on the positioning information of the mobile phone and the smartwatch 300, whether a distance between the smart speaker 400 and each of the smartwatch 300 and the second electronic device 200 is less than a distance threshold, namely, a specified threshold. If the distance between the smart speaker 400 and each of the smartwatch 300 and the second electronic device 200 is less than the specified threshold, the smart speaker 400 may output an incoming call prompt. FIG. 10A to FIG. 10C are a schematic flowchart of another call method according to an embodiment of this application. As shown in FIG. 10A to FIG. 10C, for example, the first electronic device 100 is a mobile phone A, and the second electronic device 200 is a mobile phone B. The call method may include operations S201 to S218.

For descriptions of operations S201 to S209 in this embodiment of this application, refer to operations S101 to S109 in the embodiment described in FIG. 9A to FIG. 9C. Details are not described herein again.

S210. The mobile phone B reports positioning information to the server 500.

In embodiments of this application, the mobile phone B reports the positioning information to the server 500 only when an "incoming call synchronization" control in a user interface 90 of the mobile phone B is in an enabled state, a user operation performed on an "allow" control 9032 is received in a prompt box 903, and the mobile phone B receives the calling initiated by the server 500. For the prompt box 903 and the user interface 90, refer to descriptions of FIG. 4I and FIG. 4J.

A method used by the mobile phone B to obtain the positioning information through positioning is not limited in embodiments of this application, and may be implemented by using one or more of GPS, Wi-Fi, Bluetooth, and the like. In some embodiments of this application, when the mobile phone A detects that a plurality of devices participate in calling, the call request sent to the server 500 may carry a simultaneous-ringing identifier, where the simultaneous-ringing identifier indicates that the plurality of devices are called. The server 500 may also send the simultaneous-ringing identifier when initiating calling to the mobile phone B, the smartwatch 300, and the smart speaker 400. The mobile phone B reports the positioning information to the server 500 only when the received calling initiated by the server 500 carries the simultaneous-ringing identifier.

S211. The server 500 addresses the smartwatch 300 and initiates calling.

S212. The smartwatch 300 vibrates and rings according to a profile, and displays an incoming call screen.

For operation S211 and operation S212, refer to descriptions of operation S110 and operation S111 in the call method described in FIG. 9A to FIG. 9C.

S213. The smartwatch 300 reports positioning information to the server 500.

In embodiments of this application, a time point at which the server 500 initiates calling to the smart speaker 400 may be later than a time point at which the server 500 initiates calling to the smartwatch 300 and the mobile phone B. In this way, a time point at which the server 500 obtains the positioning information of the smartwatch 300 and the positioning information of the mobile phone A may be earlier than a time point at which the smart speaker 400 obtains the positioning information of the smartwatch 300 and the positioning information of the mobile phone A from the server 500.

S214. The server 500 addresses the smart speaker 400 and initiates calling.

S215. The smart speaker 400 obtains, from the server 500, positioning information of a device having the same account.

For example, the device having the same account is included in devices associated with the first account, and the devices associated with the first account include the mobile phone B, the smartwatch 300, and the smart speaker 400. In this case, the device having the same account as the smart speaker 400 may include the mobile phone B and the smartwatch 300.

S216. The smart speaker 400 detects whether a distance between the smart speaker 400 and the device having the same account is less than or equal to a specified threshold.

In embodiments of this application, the smart speaker 400 may perform positioning to obtain positioning information of the smart speaker 400. The smart speaker 400 may detect, based on the positioning information of the smart speaker 400 and the positioning information of the smartwatch 300 that is obtained from the server, whether a distance between the smart speaker 400 and the smartwatch 300 is less than a specified threshold, for example, 20 meters. Unlimited to the distance between the smart speaker 400 and the smartwatch 300, the smart speaker 400 may further detect a distance or distances between the smart speaker 400 and either or two of the following: the mobile phone B and the smartwatch 300, and detect whether the distance or distances is/are less than or equal to the specified threshold.

S217. When the distance between the smart speaker 400 and the device having the same account is less than or equal to the specified threshold, the smart speaker 400 outputs an incoming call prompt.

In embodiments of this application, the smart speaker 400 may distinguish a personal device (for example, the mobile phone B or the smartwatch 300) from a smart speaker or a smart television that is difficult to carry. The smart speaker 400 performs operation S217 only when it is detected that the identifier of the device on which the authentication succeeds includes an identifier of a personal device having the same account. However, when it is detected that the identifier of the device on which the authentication succeeds includes an identifier of a speaker or a smart television having the same account, but does not include an identifier of a personal device having the same account, the smart speaker 400 makes no response.

S218. When the distance between the smart speaker 400 and the device having the same account is greater than the specified threshold, there is no mobile phone or smartwatch having the same account in the near field, and the smart speaker 400 ignores the calling initiated by the server 500.

For the incoming call prompt and the calling ignoring, refer to descriptions of operations S115 and S116 in the call method described in FIG. 9A to FIG. 9C. Details are not described herein again.

In some other embodiments of this application, when the smart speaker 400 receives the calling initiated by the server 500, the smart speaker 400 may alternatively report positioning information of the smart speaker 400. The server 500 may determine, based on positioning information of the smart speaker 400, the smartwatch 300, and the mobile phone B, whether the smart speaker 400 is in a same area as the mobile phone B and the smartwatch 300, for example, whether a distance between the smart speaker 400 and each of the mobile phone B and the smartwatch 300 is less than a specified threshold. Then, the server 500 may notify the smart speaker 400 of a determining result. When the determining result indicates that the smart speaker 400 is in the same area as the mobile phone B and the smartwatch 300, the smart speaker 400 outputs an incoming call prompt. When the determining result indicates that the smart speaker 400 is not in the same area as the mobile phone B and the smartwatch 300, the smart speaker 400 ignores the calling initiated by the server 500.

In the call method described in FIG. 10A to FIG. 10C, when the plurality of called devices are called, the calling initiated by the server 500 to the mobile phone B, the smartwatch 300, and the smart speaker 400 may carry the simultaneous-ringing identifier. When receiving the calling initiated by the server 500, the mobile phone B and the smartwatch 300 may report the positioning information of the mobile phone B and the smartwatch 300 to the server 500. When receiving the calling initiated by the server 500, the smart speaker 400 may obtain, from the server 500, the positioning information of the mobile phone B having the same account and the positioning information of the smartwatch 300 having the same account. The smart speaker 400 may determine, based on the positioning information of the smart speaker 400 and the positioning information of the smartwatch 300 and the mobile phone B, whether a distance between the smart speaker 400 and a device having the same account is less than a specified threshold. Only if the distance is less than the specified threshold, the smart speaker 400 outputs an incoming call prompt. Because personal devices such as the smartwatch and the mobile phone B are usually carried by a user, an incoming call prompt is output only when it is detected that a distance between the smart speaker 400 and each of the smartwatch and the mobile phone is within a range. This can reduce a case in which the incoming call prompt interferes with another person or the incoming call prompt is mistakenly answered by another person when the smart speaker 400 outputs the incoming call prompt but the user is not near the smart speaker 400. In this way, convenience of calling a plurality of devices can be improved.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

According to the context, the term "when" used in the foregoing embodiments may be interpreted as a meaning of "if", "after", "in response to determining", or "in response to detecting". Similarly, according to the context, the phrase "when it is determined that . . . " or "if (a stated condition or event) is detected" may be interpreted as a meaning of "if it is determined that . . . ", "in response to determining . . . ", "when (a stated condition or event) is detected", or "in response to detecting (a stated condition or event)".

All or some of the foregoing embodiments may be implemented by using software, hardware, firmware, or any combination thereof. When software is used to implement the embodiments, the embodiments may be all or partially implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

Persons of ordinary skill in the art may understand that all or some of the procedures of the methods in the embodiments may be implemented by a computer program instructing related hardware. The program may be stored in a computer-readable storage medium. When the program is executed, the procedures in the method embodiments may be included. The storage medium includes any medium that can store program code, such as a ROM, a random access memory RAM, a magnetic disk, or a compact disc.

What is claimed is:

1. A method for calling by a call system, the method comprises:
   obtaining, by a first electronic device, of the call system from a server of the call system, a respective association relationship between a first account for a first application installed on a second electronic device and each of an identifier of a home device of the call system and an identifier of the first electronic device, wherein the call system comprises the first electronic device, the second electronic device, the server, and the home device, and wherein the first application corresponding to the home device is logged into with the first account for responding to a user operation causing the second electronic device to send an association relationship between the first account and each of the identifiers of the home device and the second electronic device to the server;
   displaying, by the first electronic device, a call screen based on the association relationship;
   receiving, on the call screen, a first user operation used for calling the first account;
   in response to the first user operation, sending, by the first electronic device to the server, a call request used for calling the second electronic device and a call request used for calling the home device;
   separately initiating, by the server, calling to the second electronic device and the home device, wherein the calling carries a simultaneous-ringing identifier;
   outputting, by the second electronic device, an incoming call prompt when receiving the calling;
   when the calling carrying the simultaneous-ringing identifier is detected, determining by the home device, a device whose distance from the home device is within a specified threshold;
   detecting, by the home device based on the association relationship, whether the device within the specified threshold comprises a specific device having a same account as the first account and the specific device comprises the second electronic device; and
   outputting, by the home device, an incoming call prompt if the device within the specified threshold comprises the specific device having the same account.

2. A call method, comprising:
   receiving, by a home device, calling initiated by a server, wherein the calling carries a simultaneous-ringing identifier;
   when the calling that carries the simultaneous-ringing identifier is detected, detecting, by the home device, whether a device whose distance from the home device is within a specified threshold comprises a specific device having a same account; and
   outputting, by the home device, an incoming call prompt when the device within the specified threshold comprises the specific device having the same account.

3. The call method according to claim 2, wherein before the detecting, by the home device, whether a device whose distance from the home device is within a specified threshold comprises a specific device having a same account, the method further comprises:
   performing, by the home device, trust authentication on the device within the specified threshold to learn of a device on which the authentication succeeds; and
   the detecting, by the home device, whether a device within the specified threshold comprises a specific device having a same account comprises:
   detecting, by the home device, whether the device on which the authentication succeeds comprises the specific device having the same account, wherein
   the device within the specified threshold comprises the specific device having the same account when the device on which the authentication succeeds comprises the specific device having the same account.

4. The call method according to claim 2, wherein the detecting, by the home device, whether a device whose distance from the home device is within a specified threshold comprises a specific device having a same account comprises:
   obtaining, by the home device through short-range wireless search, information about the device whose distance from the home device is within the specified threshold; and
   detecting, by the home device, whether the information about the device within the specified threshold comprises information about the specific device having the same account.

5. The call method according to claim 4, wherein the obtaining, by the home device through short-range wireless search, information about the device whose distance from the home device is within the specified threshold comprises:
   obtaining, by the home device, information about a device that is located in a same Wi-Fi network as the home device, and determining the device that is located in the same Wi-Fi network as the home device as the device whose distance from the home device is within the specified threshold.

6. The call method according to claim 2, wherein the detecting, by the home device, whether a device whose distance from the home device is within a specified threshold comprises a specific device having a same account comprises:
   obtaining, by the home device from the server, an identifier of the specific device having the same account; and
   detecting, by the home device, whether a device identifier of the device within the specified threshold comprises the identifier of the specific device, wherein
   when the identifier of the device within the specified threshold comprises the identifier of the specific device, the device within the specified threshold comprises the specific device having the same account.

7. The call method according to claim 2, wherein the detecting, by the home device, whether a device whose distance from the home device is within a specified threshold comprises a specific device having a same account comprises:

obtaining, by the home device from the server, positioning information of the specific device having the same account as the home device, wherein the positioning information of the specific device is sent by the specific device to the server when the specific device receives calling; and determining, by the home device based on the positioning information of the specific device, whether a distance between the home device and the specific device is within the specified threshold.

8. The call method according to claim 2, wherein the same account is a first account, and the specific device comprises a second electronic device; and an association relationship between the first account and each of an identifier of the home device and an identifier of the second electronic device is stored on the server, and the calling is initiated to the home device and the second electronic device based on the association relationship.

9. The call method according to claim 8, wherein the specific device comprises a smartwatch, the server further stores an association relationship between the first account and an identifier of the smartwatch, and the smartwatch receives the calling initiated by the server.

10. The call method according to claim 9, wherein a first application corresponding to the home device is installed on the second electronic device, and the first application is logged in to by using the first account; and a second application corresponding to the smartwatch is further installed on the second electronic device, and the second application is logged in to by using the first account.

11. The call method according to claim 2, wherein the home device is connected to a data network or is connected to the data network through a local area network, so that the home device establishes a communication connection to the server.

12. A home device, wherein the home device comprises:
one or more processors;
a memory; and
one or more computer programs, wherein the one or more computer programs are stored in the memory, the one or more computer programs comprise instructions, and when the instructions are executed by the home device, the home device is enabled to perform the following steps:
receiving a calling initiated by a server, wherein the calling carries a simultaneous-ringing identifier;
when the simultaneous-ringing identifier is detected, detecting whether a device whose distance from the home device is within a specified threshold comprises a specific device having a same account; and
outputting an incoming call prompt when the device within the specified threshold comprises the specific device having the same account.

13. The home device according to claim 12, wherein when the instructions are executed by the home device, the home device further performs the following step:
performing trust authentication on the device within the specified threshold to learn of a device on which the authentication succeeds; and
when the instructions are executed by the home device, the home device is enabled to specifically perform the following step:
detecting whether the device on which the authentication succeeds comprises the specific device having the same account, wherein the device within the specified threshold comprises the specific device having the same account when the device on which the authentication succeeds comprises the specific device having the same account.

14. The home device according to claim 12, wherein when the instructions are executed by the home device, the home device is enabled to specifically perform the following steps:
obtaining, by the home device through short-range wireless search, information about the device whose distance from the home device is within the specified threshold; and
detecting, by the home device, whether the information about the device within the specified threshold comprises information about the specific device having the same account.

15. The home device according to claim 12, wherein when the instructions are executed by the home device, the home device is enabled to specifically perform the following steps:
obtaining information about a device that is located in a same Wi-Fi network as the home device, and determining the device that is located in the same Wi-Fi network as the home device as the device whose distance from the home device is within the specified threshold.

16. The home device according to claim 12, wherein when the instructions are executed by the home device, the home device is enabled to specifically perform the following steps:
obtaining, from the server, an identifier of the specific device having the same account; and
detecting whether a device identifier of the device within the specified threshold comprises the identifier of the specific device, wherein
when the identifier of the device within the specified threshold comprises the identifier of the specific device, the device within the specified threshold comprises the specific device having the same account.

17. The home device according to claim 12, wherein when the instructions are executed by the home device, the home device is enabled to specifically perform the following steps:
obtaining, from the server, positioning information of the specific device having the same account as the home device, wherein the positioning information of the specific device is sent by the specific device to the server when the specific device receives calling; and
determining, based on the positioning information of the specific device, whether a distance between the home device and the specific device is within the specified threshold.

18. The home device according to claim 12, wherein the same account is a first account, and the specific device comprises a second electronic device; and
an association relationship between the first account and each of an identifier of the home device and an identifier of the second electronic device is stored on the server, and the calling is initiated to the home device and the second electronic device based on the association relationship.

19. The home device according to claim 18, wherein the specific device comprises a smartwatch, the server further stores an association relationship between the first account and an identifier of the smartwatch, and the smartwatch receives the calling initiated by the server.

20. The home device according to claim 19, wherein a first application corresponding to the home device is installed on the second electronic device, and the first application is logged in to by using the first account; and a second application corresponding to the smartwatch is further installed on the second electronic device, and the second application is logged in to by using the first account.

* * * * *